US012771532B2

(12) United States Patent
White et al.

(10) Patent No.: US 12,771,532 B2
(45) Date of Patent: Oct. 20, 2026

(54) DATA TRANSMISSION

(71) Applicant: BRITISH TELECOMMUNICATIONS PUBLIC LIMITED COMPANY, London Greater London (GB)

(72) Inventors: Catherine White, London (GB); Matthew Wallwork, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 15 days.

(21) Appl. No.: 18/851,028

(22) PCT Filed: Feb. 7, 2023

(86) PCT No.: PCT/EP2023/052945
§ 371 (c)(1),
(2) Date: Sep. 25, 2024

(87) PCT Pub. No.: WO2023/186383
PCT Pub. Date: Oct. 5, 2023

(65) Prior Publication Data
US 2025/0211428 A1 Jun. 26, 2025

(30) Foreign Application Priority Data
Mar. 31, 2022 (GB) ...................................... 2204666

(51) Int. Cl.
*H04L 9/08* (2006.01)
*H04L 9/14* (2006.01)
*H04L 9/40* (2022.01)

(52) U.S. Cl.
CPC ............ *H04L 9/085* (2013.01); *H04L 9/0819* (2013.01); *H04L 9/14* (2013.01); *H04L 9/40* (2022.05); *H04L 2209/84* (2013.01)

(58) Field of Classification Search
None
See application file for complete search history.

(56) References Cited

U.S. PATENT DOCUMENTS 5,841,976 A * 11/1998 Tai ...................... H04L 12/1813 709/227
10,356,054 B2 7/2019 Dolev et al.
(Continued)

FOREIGN PATENT DOCUMENTS

CN 104993925 A 10/2015
CN 106254425 A 12/2016
CN 111162903 A 5/2020

OTHER PUBLICATIONS

International Preliminary Report on Patentability dated Oct. 10, 2024, issued for International Application No. PCT/EP2023/052945 (14 pages).
(Continued)

*Primary Examiner* — Raqiul A Choudhury
(74) *Attorney, Agent, or Firm* — Nixon & Vanderhye P.C.

(57) ABSTRACT

A method and system transmit data from a source node to a destination node through multiple intermediate nodes. The data is split into shares using a secret sharing algorithm, each routed differently through the network, though all routes share at least one common first intermediate node. At least two of the routes are different from each other. Datagrams are constructed to convey each share along its route. Each datagram is encrypted with its respective intermediate node's key and contains a payload and routing instructions directing that node to forward the payload's data toward the destination. Prior route segments are common across shares. Each datagram, except the initial one, is encapsulated within the preceding datagram's payload. At least one datagram's payload contains multiple encapsulated datagrams, with routing instructions directing the intermediate node to for-
(Continued)

ward them to different nodes. The initial datagram is transmitted to the first intermediate node.

28 Claims, 21 Drawing Sheets

(56) References Cited

U.S. PATENT DOCUMENTS

| | | | | |
|---|---|---|---|---|
| 2008/0080522 | A1* | 4/2008 | Denecheau | H04L 63/0435 370/400 |
| 2009/0103734 | A1 | 4/2009 | Hammell et al. | |
| 2009/0164663 | A1* | 6/2009 | Ransom | H04L 63/20 709/243 |
| 2009/0327730 | A1* | 12/2009 | Deishi | H04L 63/0435 713/171 |
| 2012/0183145 | A1* | 7/2012 | Sudhakar | H04L 63/061 380/283 |
| 2013/0305046 | A1* | 11/2013 | Mankovski | H04L 9/0894 713/168 |
| 2017/0093811 | A1 | 3/2017 | Dolev et al. | |
| 2017/0127147 | A1* | 5/2017 | Crabtree | H04N 21/8456 |
| 2018/0234164 | A1* | 8/2018 | Hardy | H04N 7/188 |
| 2019/0306131 | A1 | 10/2019 | Dolev et al. | |
| 2021/0092595 | A1 | 3/2021 | Ramachandran et al. | |
| 2022/0174095 | A1* | 6/2022 | Rahman | H04L 9/0852 |

OTHER PUBLICATIONS

Alexander Hill et al: "Drone-Based Quantum Key Distribution", published May 2020 (3 pages).
Anonymous: "Reverse DNS lookup—Wikipedia", Aug. 14, 2016 (Aug. 14, 2016), pp. 1-3, XP055601206, Retrieved from the Internet: URL: https://en.wikipedia.org/w/index.php7t [retrieved on Jul. 1, 2019] the whole document (3 pages).
Bob Yirka, "Using Drones to Create Local Quantum Networks" available at https://phys.org/news/2021-01-drones-local-quantum-networks.html., Jan. 18, 2021 (3 pages).
Combined Search and Examination Report for GB2204666.8 Dated Sep. 21, 2022 (6 pages).
Eleni Diamanti et al: "Practical Challenges in Quantum Key Distribution", Jun. 19, 2016 (14 pages).
Engelmann Anna et al: "Defying Censorship with Multi-Circuit Tor and Linear Network Coding" , 2019 12th CMI Conference on Cybersecurity and Privacy (CMI), IEEE, Nov. 28, 2019 (Nov. 28, 2019), pp. 1-6, XP033691074 (6 pages).
Michael K. Reiter and Aviel D. Rubin, Crowds: Anonymity for Web Transactions, AT&T Labs—Research; http://www.bit.bme.hu/~buttyan/course/BMEVIHIM219/ReiterR.Crowds.pdf,published Nov. 1, 1998 (23 pages).
Hua-Ying Liu et al: "Drone-Based Entanglement Distribution Towards Mobile Quantum Networks", National Science Review, 2020, vol. 7, No. 5 (8 pages).
International Search Report and the Written Opinion for PCT/EP2023/052945 Dated Jul. 19, 2023 (24 pages).
Koshy Akshay Mammen et al: "An Insight into Encrypted DNS protocol: DNs over TLS", 2021 4th International Conference on Recent Development in Control, Automation & Power Engineering (RDCAPE), IEEE, Oct. 7, 2021 (Oct. 7, 2021), pp. 379-383, XP034043708 (5 pages).
Lei Yang et al: "mTor: A multipath Tor routing beyond bandwidth throttling", 2015 IEEE Conference on Communications and Network Security (CNS), IEEE, Sep. 28, 2015 (Sep. 28, 2015), pp. 479-487, XP032825430 (9 pages).
Mashael Alsabah et al: "The Path Less Travelled: Overcoming Tor's Bottlenecks with Traffic Splitting", Jul. 10, 2013 (Jul. 10, 2013), Privacy Enhancing Technologies, Springer Berlin Heidelberg, Berlin, Heidelberg, pp. 143-163, XP047031284 (21 pages).
Notification of Grant dated Jul. 2, 2024, issued for GB2204666.8 (2 pages).
Partial International Search Report and Invitation to Pay Additional Fees for PCT/EP2023/052945 dated May 10, 2023 (16 pages).
Samantha Isaac et al: "Drone-Based Quantum Key Distribution", CLEO 2020 © OSA 2020 (2 pages).
Trinh Phuc V et al: "Quantum Key Distribution over FSO: Current Development and Future Perspectives", 2018 Progress in Electromagnetics Research Symposium (Piers-Toyama), Japan, Aug. 1-4, The Institute of Electronics, Information and Communication Engineers (IEICE), Aug. 1, 2018 (Aug. 1, 2018), pp. 1672-1679, XP033488567 (8 pages).
UK Research and Innovation Project Abstract (Airbus Group Limited) "Q-Dos light: Quantum key distribution for Drones with Optimal Size, weight and power" available at https://gtr.ukri.org/projects?ref=103874 last updated Jul. 6, 2024 (3 pages).
UK Research and Innovation Project Abstract (University of Oxford) "Q-Dos light: Quantum key distribution for Drones with Optimal Size, weight and power" available at https://gtr.ukri.org/projects?ref=EP%2FR019517%2F1 last updated Jul. 6, 2024 (3 pages).

* cited by examiner

DATA TRANSMISSION

CROSS-REFERENCE TO RELATED APPLICATIONS

This application is the U.S. national phase of International Application No. PCT/EP2023/052945 filed Feb. 7, 2023 which designated the U.S. and claims priority to GB 2204666.8 filed Mar. 31, 2022, the entire contents of each of which are hereby incorporated by reference.

FIELD OF THE INVENTION

The present invention relates to the transmission of data through a network. In particular, it relates to the transmission of data through a network to a destination node via a plurality of intermediate nodes.

BACKGROUND TO THE INVENTION

Quantum Key Distribution (QKD) involves the use of quantum mechanics to securely share cryptographic keys which can then be used to secure further communications between two entities. A key principle of QKD is that any eavesdropping during transmission of the cryptographic keys can be detected. This is achieved by encoding the information to be sent onto individual photons (e.g. onto the polarization or phase of the photon) and then transmitting the photons through a suitable transmission medium (or channel) to the receiver. Since an eavesdropper does not how each photon has been prepared, they are unable to make a compatible measurement of the state of the photon as it traverses the channel without disturbing the quantum information with high probability. Disturbances to the expected measured values at the detectors (e.g. resulting in a quantum bit error rate or a lowered interferometer visibility) can then be used to determine whether the photon was observed during transmission. Accordingly, it can be determined whether a cryptographic key (or parts thereof) has been compromised prior to its use. This means that any cryptographic keys (or parts thereof) that were compromised during transmission can be discarded and not subsequently used. QKD can be performed until a cryptographic key has been successfully shared without being compromised (e.g. once enough bits of information to function as a cryptographic key have been transmitted without being compromised). This cryptographic key can then be used to secure the communications between the two entities using traditional symmetric cryptographic techniques, such as through the use of the One-Time Pad or Advanced Encryption Standard (AES) algorithms Conventionally optical fibre is used as the transmission medium for performing QKD. However, optical fibre suffers from significant signal losses due to photon scattering. These losses limit the distance over which QKD can be achieved using optical fibre transmission.

An alternative transmission medium which can used with QKD is free-space, which enables communication between entities which are not physically connected, provided there is a clear line of sight. This requirement for a clear line of sight limits the distance over which QKD can be achieved using free-space optical transmission. Free-space channels also suffer from loss due to scattering from gases and particles in the line-of-sight free-space channel, as well as loss due to beam divergence.

In order to expand the range over which QKD may be performed, trusted relays (or repeaters) may be used as intermediaries to pass the communications between the two entities. For example, a satellite may receive information from one entity and relay it to the other. This approach can greatly increase the range over which QKD may be performed. However, it is susceptible to interference, for example from the weather, preventing clear line of sight communication between the satellite and either of the entities (which may be referred to as ground stations). Furthermore, the range achievable using such an arrangement is still limited by the curvature of the Earth, especially given that satellites used for such purposes are typically in a Low Earth Orbit (LEO).

To address such shortcomings, the use of aerial vehicles, such as unmanned aerial vehicles (UAVs) has been proposed to act as a further intermediary allowing communication to be further relayed to avoid such issues. However, this introduces a significant risk that the cryptographic key that is communicated could be discovered. For example, if the aerial vehicle were to be captured or otherwise compromised by an adversary, the cryptographic key may be recoverable from the on-board systems that were involved in relaying the cryptographic key (e.g. from on-board memory). As a result, even though the cryptographic key was not intercepted during transmission (as would be detected by the QKD technique), any communications between the entities that are secured using that cryptographic key could still be compromised.

SUMMARY OF THE INVENTION

Accordingly, it would be beneficial to provide a way for transmitting data, such as a cryptographic key, from one entity to another across a network via intermediate nodes, such as aerial vehicles, in such a way that it is harder for the data to be recovered from the intermediate nodes in the event of an intermediate node being compromised.

In a first aspect of the present invention, there is provided a computer implemented method of transmitting data through a network, performed by a source node to transmit data to a destination node via a plurality of intermediate nodes, the method comprising: splitting the data into a plurality of shares using a secret sharing algorithm; determining a respective route through the network to the destination node for each of the plurality of shares, each route comprising a plurality of intermediate nodes via which that share is to be transmitted, wherein at least two of the routes are different from each other and at least a first intermediate node of each route is common to the other routes; constructing a plurality of datagrams for conveying the plurality of shares through the network along their respective routes, each datagram being intended for processing by a respective intermediate node and being encrypted with a key associated with that intermediate node, each datagram comprising a payload and routing information for instructing the respective intermediate node to forward data contained in the payload for conveying one or more of the shares along their respective routes towards the destination node, wherein: the portion of the respective routes of the one or more shares prior to the respective intermediate node are common to each other; each datagram other than an initial datagram intended for the first intermediate node is encapsulated within the payload of a preceding datagram intended for a preceding intermediate node on the respective routes of the one or more shares; the payload of at least one of the datagrams comprises a plurality of encapsulated datagrams; and the routing information of the at least one of the datagrams instructs the respective intermediate node to transmit the plurality of encapsulated datagrams on to different respective intermediate nodes in the network; and transmitting the initial datagram to the first intermediate node.

Each of the routes may be different from the other routes.

The initial datagram may comprise a plurality of encapsulated datagrams for onward transmission to different respective intermediate nodes.

One or more of the datagrams subsequent to the initial datagram comprises a plurality of encapsulated datagrams for onward transmission to different respective intermediate nodes.

The datagrams may be encrypted using symmetric cryptography.

The data may comprise an encryption key for encrypting communications between the source node and the destination node.

The transmissions within the network may be made using quantum channels.

The intermediate nodes may be provided by a plurality of unmanned aerial vehicles.

The determination of the respective routes through the network may be based, at least in part, on the flight plans of the unmanned aerial vehicles.

The intermediate nodes may further comprise an intermediate node provided by a satellite, the satellite providing the first intermediate node.

The intermediate nodes may comprise virtual network nodes that are each separately identifiable and each associated with their own respective key, wherein each virtual network node is provided by a respective physical network node and at least two of the virtual network nodes are provided by the same physical network node.

At least one of the respective routes may use different virtual network nodes that are provided by the same physical network node as separate intermediate nodes.

At least two of the respective routes may make use of different virtual network nodes that are provided by the same physical network node as intermediate nodes.

The method may further comprise communicating with an alias managing authority according to a sixth aspect of the invention to obtain an encrypted representation of an identity of an intermediate node for inclusion in the routing information of a datagram, the encrypted representation being encrypted using a key that is shared between an intermediate node intended to process the datagram and the alias managing authority.

The plurality of intermediate nodes are operated by a plurality of different entities, each intermediate node being operated by a respective one of the entities, wherein the determination of the respective routes through the network are based, at least in part, on the entities that are operating the intermediate nodes.

At least one of the datagrams may further comprise instructions for instructing the respective intermediate node that is intended to process that datagram to reconstruct a datagram to be processed by that intermediate node by combining one or more shares conveyed by that datagram with one or more shares conveyed by at least one other datagram in accordance with a secret sharing algorithm. The at least one other datagrams may each be configured to be conveyed to the respective intermediate node via a different respective route.

Through the use of this method, the sender (or source node) is enabled to control the transmission of the data through the network in such a way that multiple routes through the network are involved in conveying the data. As a result, it would be necessary for multiple intermediate nodes to be compromised before the transmitted data can be uncovered, thereby improving its security.

In a second aspect of the present invention, there is provided a computer implemented method of transmitting data through a network from a source node to a destination node via a plurality of intermediate nodes, the method being performed by one or more of the intermediate nodes in the network to facilitate the transmission of data through the network from a source node to a destination node via a plurality of intermediate nodes, the method comprising: receiving a datagram, the datagram being encrypted using a key associated with the intermediate node; decrypting the datagram using the key to create a decrypted datagram, the decrypted datagram comprising a plurality of encapsulated datagrams, each of the encapsulated datagrams being encrypted with a key associated with another node and being associated with respective routing information; transmitting each of the encapsulated datagrams on to a different respective node in accordance with the respective routing information.

The datagram may be received from the source node.

The intermediate node may be provided by a satellite.

The datagram may be received from another one of the intermediate nodes.

The intermediate node may be provided by an unmanned aerial vehicle.

The key may be a symmetric key shared between the intermediate node and the source node.

The datagram and the encapsulated datagrams may be respectively received and transmitted using quantum channels.

The intermediate node may be one of a plurality of virtual network nodes that is provided by the same physical network node, wherein each of the virtual network nodes is separately identifiable and associated with their own respective key.

The received datagram may be a partial datagram and comprises instructions for instructing the intermediate node to combine one or more shares conveyed by that partial datagram with one or more shares conveyed by at least one other datagram in order to reconstruct the datagram. The method may further comprise: receiving a further datagram from a different intermediate node; and combining one or more shares conveyed by the further datagram with one or more shares conveyed by the received datagram to reconstruct the datagram.

In a third aspect of the present invention, there is provided a network node configured to act as an intermediate node in a network for facilitating the transmission of data through the network from a source node to a destination via a plurality of intermediate nodes by performing a method according to the second aspect.

In a fourth aspect of the present invention, there is provided a computer system comprising a processor and a memory storing computer program code for performing a method according to either of the first or second aspects.

In a fifth aspect of the present invention, there is provided a computer program which, when executed by one or more processors, is arranged to carry out a method according to either of the first or second aspects.

In a sixth aspect of the present invention, there is provided an alias managing authority comprising: an alias repository for storing aliases for nodes in a network, each alias being associated with a respective network node; a key repository for storing cryptographic keys, each key being associated with a respective network node; a query processor configured to respond to requests for aliases by: receiving a request for an identifier for a network node, the request comprising an indication of a target node to which the identifier relates and an indication of the node that is intended to process the identifier; identifying an alias for the target node which is known to the node that is intended to process the identifier; encrypting the alias for the target node using a key for the node that is intended to process the identifier; and providing the encrypted alias in response to the request.

BRIEF DESCRIPTION OF THE FIGURES

Embodiments of the present invention will now be described by way of example only, with reference to the accompanying drawings, in which.

DETAILED DESCRIPTION OF EMBODIMENTS

Figure 1:
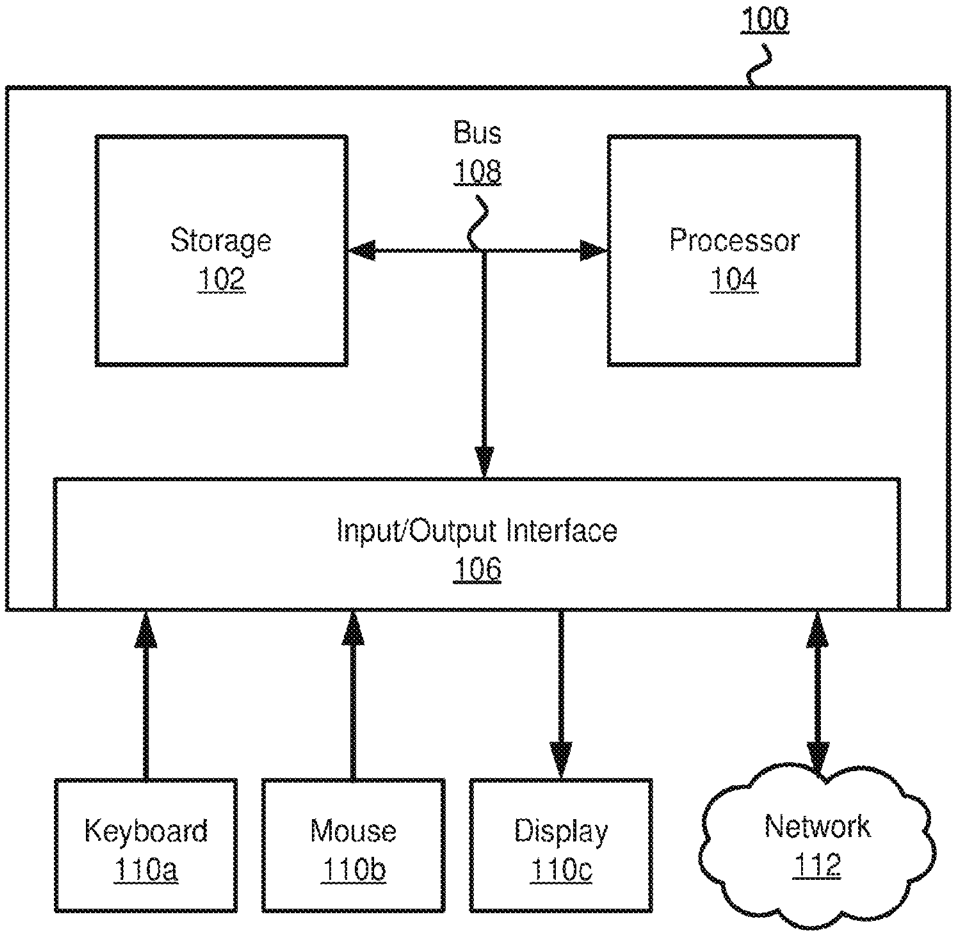
FIG. 1 is a block diagram of a computer system suitable for the operation of embodiments of the present invention.

FIG. 1 is a block diagram of a computer system 100 suitable for the operation of embodiments of the present invention. The system 100 comprises: a storage 102, a processor 104 and an input/output (I/O) interface 106, which are all communicatively linked over one or more communication buses 108.

The storage (or storage medium or memory) 102 can be any volatile read/write storage device such as a random access memory (RAM) or a non-volatile storage device such as a hard disk drive, magnetic disc, optical disc, ROM and so on. The storage 102 can be formed as a hierarchy of a plurality of different storage devices, including both volatile and non-volatile storage devices, with the different storage devices in the hierarchy providing differing capacities and response times, as is well known in the art.

The processor 104 may be any processing unit, such as a central processing unit (CPU), which is suitable for executing one or more computer programs (or software or instructions or code). These computer programs may be stored in the storage 102. During operation of the system, the computer programs may be provided from the storage 102 to the processor 104 via the one or more buses 108 for execution. One or more of the stored computer programs, when executed by the processor 104, cause the processor 104 to carry out a method according to an embodiment of the invention, as discussed below (and accordingly configure the system 100 to be a system 100 according to an embodiment of the invention).

The input/output (I/O) interface 106 provides interfaces to devices 110 for the input or output of data, or for both the input and output of data. The devices 110 may include user input interfaces, such as a keyboard **110*a* or mouse 110*b* as well as user output interfaces such as a display 110*c*. Other devices, such a touch screen monitor (not shown) may provide means for both inputting and outputting data. The input/output (I/O) interface 106 may additionally or alternatively enable the computer system 100 to communicate with other computer systems via one or more networks 112. It will be appreciated that there are many different types of I/O interface that may be used with computer system 100 and that, in some cases, computer system 100 may include more than one I/O interface. Furthermore, there are many different types of device 100 that may be used with computer system 100. The devices 110 that interface with the computer system 100 may vary considerably depending on the nature of the computer system 100 and may include devices not explicitly mentioned above, as would be apparent to the skilled person. For example, in some cases, computer system 100 may be a server without any connected user input/output devices. Such a server may receive data via a network 112, carry out processing according to the received data and provide the results of the processing via a network 112**.

It will be appreciated that the architecture of the system 100 illustrated in FIG. 1 and described above is merely exemplary and that other computer systems 100 with different architectures (such as those having fewer components, additional components and/or alternative components to those shown in FIG. 1) may be used in embodiments of the invention. As examples, the computer system 100 could comprise one or more of: a personal computer; a laptop; a tablet; a mobile telephone (or smartphone); a television set (or set top box); a games console; an augmented/virtual reality headset; a server; or indeed any other computing device with sufficient computing resources to carry out a method according to embodiments of this invention.

Figure 2:
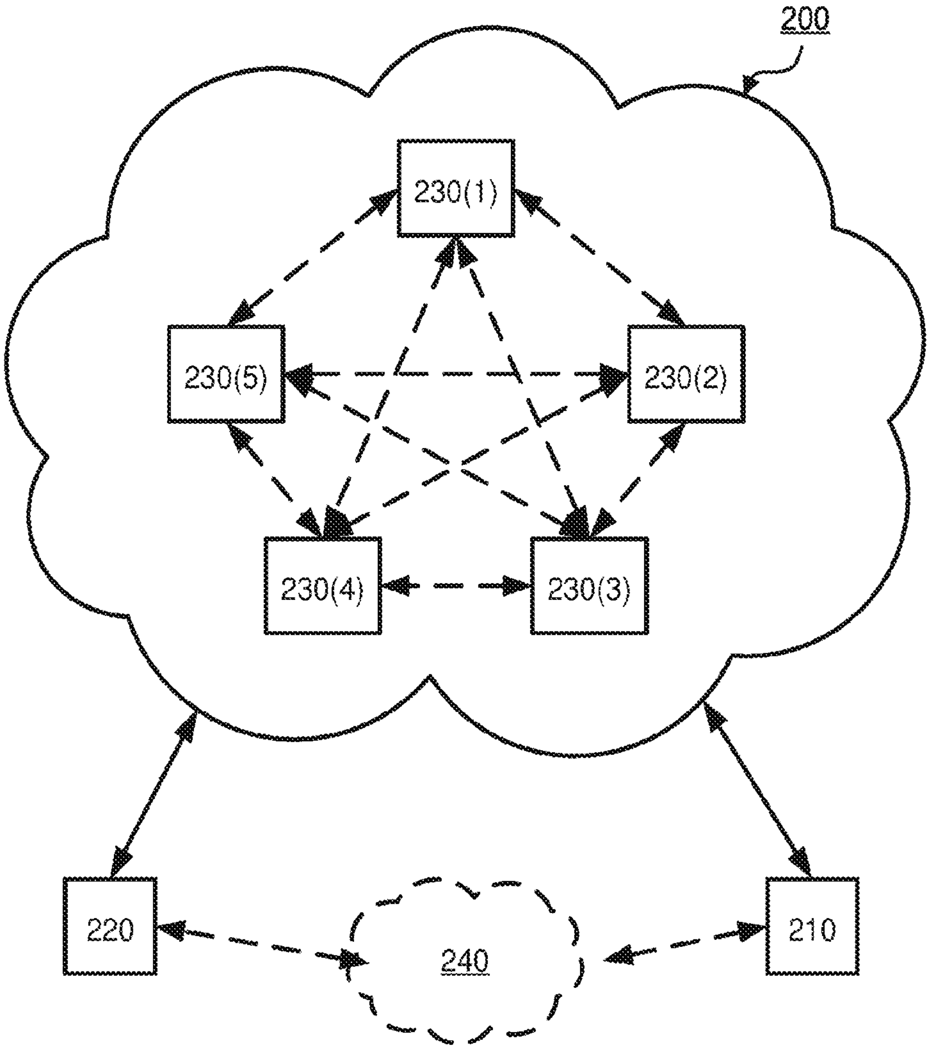
FIG. 2 is a block diagram illustrating an example of a network through which data may be transmitted from a source node (or sender) to a destination node (or receiver) in accordance with embodiments of the invention.

FIG. 2 is a block diagram illustrating an example of a network 200 through which data may be transmitted from a source node 210 (or sender) to a destination node 220 (or receiver) in accordance with embodiments of the invention.

The network 200 comprises a plurality of intermediate nodes 230 via which the data is transmitted between the source node 210 and the destination node 220. In the example illustrated in FIG. 2, the network comprises five intermediate nodes 230, including a first intermediate node 230(1), second intermediate node 230(2), third intermediate node 230(3), fourth intermediate node 230(4) and fifth intermediate node 230(5). However, it will be appreciated that a different number of intermediate nodes 230 may be used instead. That is to say, the network 200 may comprise more or fewer intermediate nodes 230 than illustrated in FIG. 2.

The source node 210 and destination node 220 are able to communicate with each other via the intermediate nodes 230 of the network 200. That is to say, the intermediate nodes 230 forward (or relay) data from the source node 210 to the destination node 220. The source node 210 and the destination node 220 are able to communicate with the intermediate nodes 230 of the network 200 in order to transmit data into the network 200 and receive data from the network 200 respectively. In some cases, the source node 210 and/or destination node 220 may be able to directly communicate with all of the intermediate nodes 230 of the network 200. However, in other cases, the source node 210 and/or destination node 220 may only be able to directly communicate with a subset of the intermediate nodes 230. The subset of intermediate nodes 230 that the source node 210 is in direct communication with may be different from the subset of intermediate nodes 230 that the destination node 220 is in direct communication with. As will be appreciated from the following description, the source node 210 only needs to be able to directly communicate with a single intermediate node 230 (although of course may be able to directly communicate with more). Ideally, the destination node 220 should be able to directly communicate with at least two intermediate nodes 230 (however, some advantage may still be provided even where the destination node 220 can only directly communicate with a single intermediate node 230—especially where that single intermediate node 230 can be considered to be highly secure and resilient to failure). Any suitable communications medium may be used to enable the source node 210 and destination node 220 to communicate with the intermediate nodes 230 of the network 200, such as Ethernet, radio, optical fibre or the use of free-space optical transmission.

Figure 3:
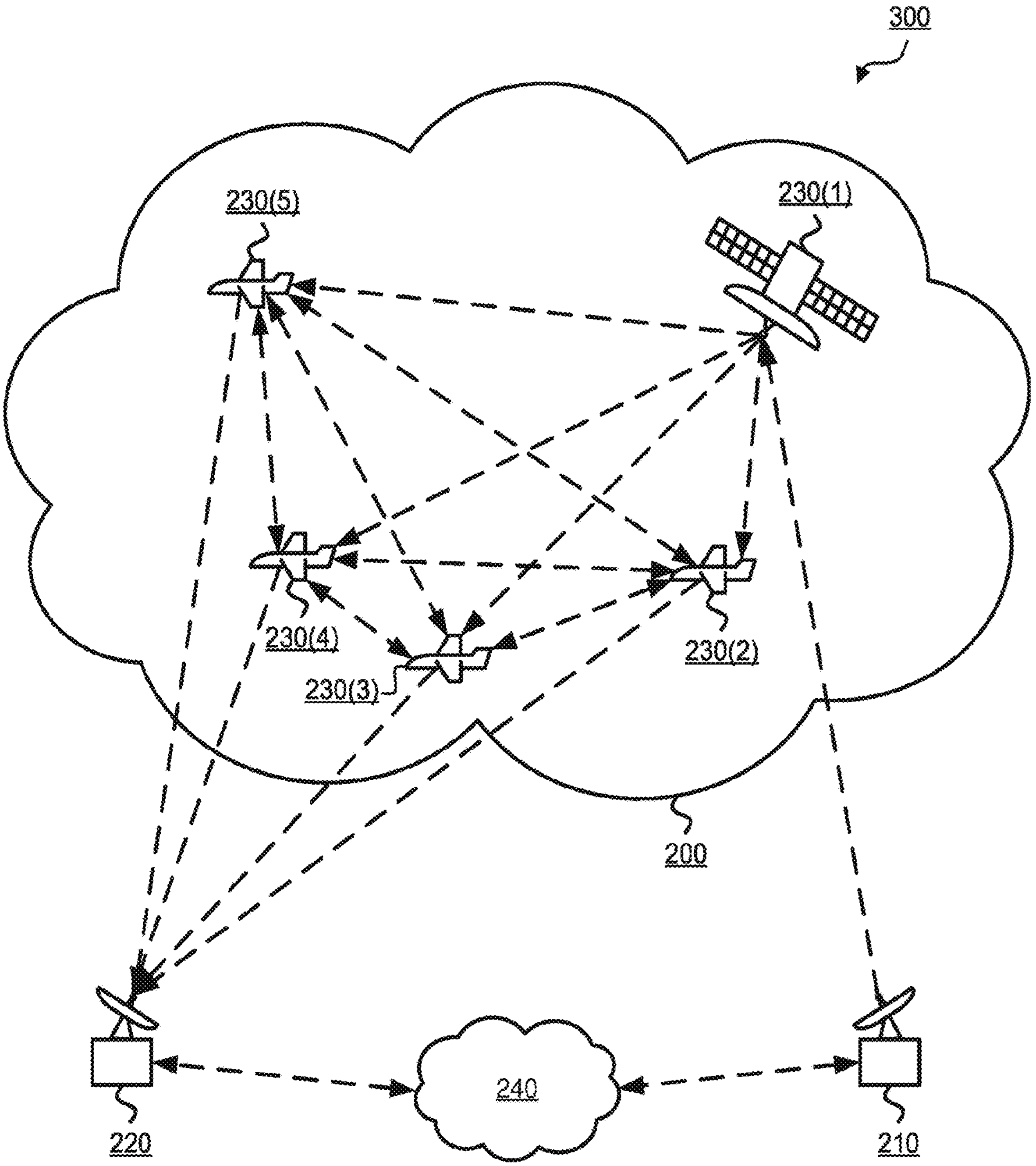
FIG. 3 is a diagrammatic representation of an example of an implementation of the network illustrated in FIG. 2

The intermediate nodes 230 are communicatively intercoupled such that data can be communicated between the intermediate nodes 230 within the network 200. In some cases, the intermediate nodes 230 may be fully interconnected such that each intermediate node 230 may directly communicate with each of the other intermediate nodes 230, as shown in FIGS. 2 and 3. However, it will be appreciated from the following description that this is not necessary (i.e. the intermediate nodes 230 need not be fully interconnected) and in some cases there may be some intermediate nodes 230 which cannot directly communicate with some other intermediate nodes 230 within the network 200. In such cases, data may pass between two intermediate nodes 230 that are not able to communicate directly by forwarding (or relaying) it via one or more other intermediate nodes 230. For example, in the example shown in FIG. 2, if direct communication were not possible between the first intermediate node 230(1) and the fifth intermediate node 230(5), data could nonetheless be conveyed between the first and fifth intermediate nodes 230(1) and 230(5) via any of the other intermediate nodes 230(2), 230(3) or 230(4). Furthermore, as will be apparent from the following discussion, the connections between the intermediate nodes 230 in the network 200 need not form a connected graph. That is to say, the connections may form a graph having multiple component subgraphs, whereby the intermediate nodes 230 belonging to one subgraph may not be able to communicate with intermediate nodes 230 belonging to other subgraphs. Any suitable communications medium may be used to enable the intermediate nodes 230 to communicate amongst themselves, such as Ethernet, radio, fibre optic or the use of free-space optical transmission.

In some cases, the intermediate nodes 230 may be configured to authenticate each other, so as to ensure that the identity of the node with which they are communicating is correct (and not, for example, an imposter). Any suitable means of authentication may be used, such as the use of Public Key Infrastructure (PKI), as will be familiar to the skilled person.

Although the source node 210 and destination node 220 have been shown in FIG. 2 as being outside of the network 200, this need not be the case and in some cases the source node 210 and/or destination node 220 may be considered to be inside the network 200. Furthermore, in some cases, the source node 210 and/or destination node 220 may serve as an intermediate node 230 to facilitate communication between other nodes via the network 200.

In some cases, the source node 210 and destination node 220 may also be connected to another network 240 that is separate to the network 200. This means that communication between the source node 210 and destination node 220 may also be effected via that other network 240. In such cases, the network 200 may be used to share an encryption key between the source node 210 and the destination node 220. This encryption key can be used to secure (by encrypting) subsequent communications via the other network 240.

The use of a separate network to send the encryption key will in itself improve the security of the communications, since an adversary would need to gain access to the data traversing both networks in order to compromise the communications. However, this security can optionally be improved through the use of quantum channels within the network 200. The use of quantum channels to communicate between each of the nodes involved in conveying the data representing the encryption key (i.e. the source node 210, intermediate nodes 230 and destination node 220) enables any eavesdropping to be detected as discussed above. Therefore it can be determined whether the encryption key has been securely shared prior to its use for subsequent communication. Additionally or alternatively, where communication between nodes is effected wirelessly, the use of low power and/or highly directional communications to transmit the data between each of the nodes can further improve security by requiring an attacker to be within close proximity to intercept the communications (to the extent that they would be visible). Another alternative, where the intermediate nodes 230 (as will be discussed in more detail below) are mobile is for the intermediate nodes 230 to directly dock with each other in order to securely exchange data.

Each of the intermediate nodes 230 has its own respective cryptographic key. The cryptographic key for an intermediate node 230 is used by the source node 210 to encrypt data for processing by that intermediate node 230 in order to transmit the data through the network, as will be discussed in more detail below.

In some cases, asymmetric encryption may be used, in which case the cryptographic key may take the form of a public/private key pair, as will be familiar to those skilled in the art. In such cases, the source node 210 will make use of the public part of the cryptographic key for an intermediate node 230 (otherwise referred to as the public key) in order to encrypt data intended for processing by that intermediate node 230. Meanwhile, each intermediate node 230 will make use of the private part of its respective cryptographic key (otherwise referred to as the private key) to decrypt any data intended for processing by that node. A benefit of using asymmetric encryption in this way is that each intermediate node 230 only requires a single cryptographic key. This is because the same public key for an intermediate node 230 can be provided for use by all source nodes that may wish to utilise the network 200 to send data without risking compromise of that data.

In other cases, symmetric encryption may be used, in which case the same cryptographic key is used for both encrypting and decrypting data, as will be familiar to those skilled in the art. In such cases, each intermediate node 230 has a separate cryptographic key for use with each source node that wishes to utilise the network 200 to send data. The use of symmetric encryption can provide more secure communications in the face of advances in computing power (such as quantum computing) that may eventually render asymmetric encryption techniques that rely on complexity of computation insecure. For example, the one-time pad algorithm will continue to provide security even in the face of such advances.

The use of symmetric cryptography may make key distribution and refresh more complicated. However, where the intermediate nodes 230 are able to make use of quantum channels, the properties of those channels can be used to securely distribute the keys for the intermediate nodes 230 (i.e. via QKD) overcoming at least some of these challenges. Similarly, other techniques (that have already been discussed) may be used to securely distribute keys, such as the use of low power and/or highly directional communications to transmit the data (allowing visual confirmation of secure communication due to the requirement for an attacker to be very close), Physical Layer Security or indeed physical docking between nodes. Furthermore, as will be apparent from the following description, the methods described herein may additionally be used to share these cryptographic keys with the source node 210. That is to say, an intermediate node 230 for a subsequent communication session may be the source node 210 during a setup communication session to share a key for the subsequent communication session. Meanwhile, the source node 210 for the subsequent communication session may be the destination node 220 during the setup communication session. The methods described herein may then be used to securely transmit the cryptographic key for that intermediate node 230 to the source node 210 via other intermediate nodes 230 in the network 200 during the setup communication session for use by the source node 210 in the subsequent communication session.

Key management of symmetric or asymmetric keys can use reference to a key ID. A node or host may maintain a list of other nodes (by ID or address) that it shares key material with, and a list of key IDs may be referenced under the host name. The keys may also be marked with an expiry date, after which they will not be used, and reference to them may be deleted from the data structures used in key management.

In some cases, some or all of the intermediate nodes 230 may be virtual network nodes that are each provided by a respective physical network node. These virtual network nodes are each separately identifiable and have their own respective cryptographic keys, meaning that from the network's perspective they are indistinguishable from a non-virtual network node. In some cases, these virtual network nodes may be provided by separate computing environments within the physical network node, such as through the use of virtualisation. In other cases, these virtual network nodes may simply be aliases for the same network node (either physical or virtual). Since multiple virtual network nodes may be provided by the same physical network node, the five intermediate nodes 230 shown in FIG. 2 may in fact be provided by fewer than five physical network nodes (i.e. with at least two of the virtual network nodes being provided by the same physical network node).

FIG. 3 is a diagrammatic representation of an example of an implementation 300 of the network 200 illustrated in FIG. 2. This implementation 300 utilises a satellite and a plurality of unmanned aerial vehicles (UAVs) to provide the intermediate nodes 230 of the network 200.

In this implementation 300, the source node 210 is able to directly communicate with the first intermediate node 230(1) provided by the satellite. Meanwhile, the destination node 220 is able to directly communicate with the intermediate nodes 230(2), 230(3), 230(4) and 230(5) provided by the UAVs. The intermediate nodes 230 are fully interconnected, such that each of the intermediate nodes 230 can directly communicate with each of the other intermediate nodes 230. Any suitable wireless communication medium, such as radio or free-space optical transmission, may be used to convey data between the nodes. However, it is preferable (but not necessary) that free-space optical transmission is used to enable quantum-based detection of any eavesdropping during the transmissions between needs in the network 200 (especially where the network 200 is being used to communicate encryption keys between the source node 210 and the destination node 220).

It will be appreciated that the implementation 300 illustrated in FIG. 3 has been simplified so as to more clearly illustrate the invention. It is noted, for example, that it is expected that many implementations will have less connectivity between nodes. That is to say that the intermediate nodes 230 are not fully interconnected and/or that the destination node 220 cannot directly communicate with all of the available intermediate nodes 230. Similarly, the source node 210 may also be able to communicate with additional intermediate nodes 230 besides the first intermediate node 230(1) provided by the satellite. Furthermore, the first intermediate node 230(1) could be provided by other types of node, such as by another UAV or a ground station.

Given the mobile nature of the UAVs, it is anticipated that the connectivity between the intermediate nodes 230, as well as between the source node 210 and the intermediate nodes 230 and the destination node 220 and the intermediate nodes 230, will change over time as the UAVs move relative to one another. It is also possible, that the UAVs move to facilitate the transmission of the data. That is to say, a ground control station (not shown in FIG. 3) may be responsible for orchestrating the flight paths of the UAVs and may instruct UAVs to move to positions that facilitate a desired transmission of data between particular intermediate nodes 230. Accordingly, the intermediate nodes 230 may cache data that has been received until such a time that it is possible to communicate with the node to which the data needs to be forwarded to. For example, an intermediate node 230 provided by a particular UAV may receive the data while the UAV is at a first location, cache the data while the UAV moves to a second location from which it is possible to communicate with another node and then transmit the data to that other node once the UAV has reached the second location.

The mobility of the UAVs may additionally be used for the purposes of sharing cryptographic keys between the intermediate nodes 230 and the source node 210. Specifically, prior to the use of the network 200 by the source node 210 to transmit data, the UAVs may move to a position from which they can securely communicate with the source node 210 (e.g. where direct free-space optical communication can be used to communicate either directly with the source node or indirectly via direct communication with the satellite, allowing any eavesdropping to be detected via quantum techniques).

The implementation 300 will now be discussed further in relation to FIG. 4.

Figure 4:
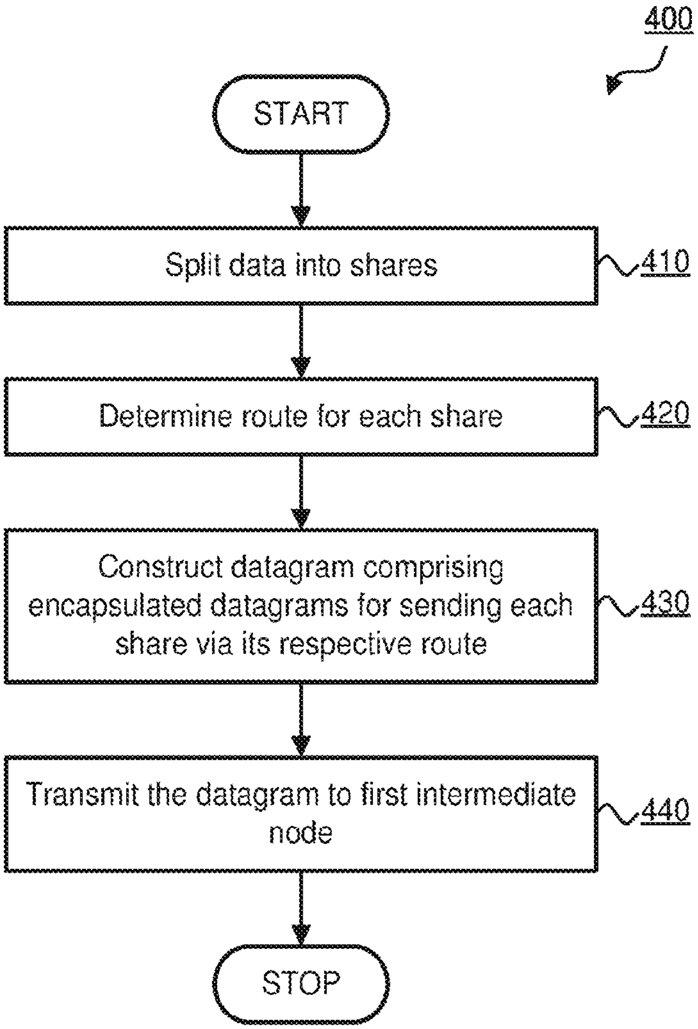
FIG. 4 is a flowchart illustrating a method of transmitting data through the network.

FIG. 4 is a flowchart illustrating a method 400 of transmitting data through the network 200. Specifically, the method 400 is performed by the source node 210 to transmit data to the destination node 220 via the plurality of intermediate nodes 230 in the network 200.

At an operation 410, the method 400 splits the data to be transmitted into a plurality of shares using a secret sharing algorithm. That is to say, a plurality of shares is generated which collectively represent the data to be transmitted. Although none of the shares individually allow the data to be obtained, when a sufficient number of the shares are combined, the data can be recovered, as will be known to those skilled in the art. Any suitable secret sharing algorithm may be used. For example, any of Shamir's Secret Sharing algorithm, Blakey's Secret Sharing algorithm, or XOR Secret Sharing (whereby all but one of the shares are randomly generated, with the remaining share being determined by using the exclusive or (XOR) operation to combine the other shares and the data to be transmitted) can be used.

As will be known to those skilled in the art, various secret sharing algorithms support the use of a threshold number of shares for recovering the data from the generated shares. This threshold specifies the number of shares that are required for the data to be recovered. Accordingly, where such a threshold is specified (and is lower than the number of shares that were generated), the receiver does not need to obtain all of the shares that were generated in order to recreate the data. This can be used to provide redundancy since the data can be recreated even if some of the generated shares fail to reach the destination node provided that at least the threshold number of shares do reach the destination.

Having created a plurality of shares representing the data to be transmitted through the network 200 at operation 410, the method proceeds to an operation 420.

At operation 420, the method 400 determines a respective route (or path) that each of the shares should take through the network 200 to the destination node 220. These routes specify which intermediate nodes 230 each share will pass through and in what order. Each route involves more than one (i.e. a plurality) of intermediate nodes 230.

The routes are ideally determined such that each route is different from the other routes, meaning that each of the shares will follow a different route through the network 200 to the destination node 220. Indeed, the greater the number of routes that are different from each other, the better the security that will be provided for the present data. Although in the following discussion the routes will be described as all being different from each other, it will be appreciated that in some (less ideal) cases, some of the routes for different shares may be the same as each other. However, although this is less ideal, such cases may still provide an increased level of security for the transmitted data provided that at least two of the routes are different from each other. Indeed, more generally, an increased level of security for the transmitted data may be provided where the number of different routes is at least equal to the number of different shares required to reconstruct the data. By different, it is meant simply that no two routes involve the same intermediate nodes 230 being visited in the same order. For example, two routes may differ in that they use different sets of intermediate nodes 230 (even if those sets only differ by a single intermediate node 230). Similarly, two routes may use the same sets of intermediate nodes 230, but nonetheless differ in that those intermediate nodes are to be visited in a different order. All of the routes share at least a first intermediate node 230(1) which is common to all of the routes (even where each route is different). That is to say, each of the routes through the network 200 use the same intermediate node 230(1) as their starting point. Accordingly, the routes may be considered as collectively forming a rooted tree structure, with the first intermediate node 230(1) that is the common starting point for all of the routes being the root of the tree and the final intermediate nodes on each route being the leaves.

In some cases, when performing method 400, the source node 210 first defines a data structure representing such a tree (referred to herein as a splitting tree) representing the pattern of routing for the data for transmitting the data through the network 200. Any suitable data structure for storing a tree can be used, such as a nested dictionary structure. This data structure represents the structure of the routing, such as the number of generations (or hops) and the number of children at each split. The splitting tree may be generated automatically based on parameters defining the properties that it should have. For example, parameters such as a number of generations in the splitting tree and the number of children at each split can be defined and the splitting tree generated accordingly. In some cases, the splitting tree may include an element of randomness in its generation. That is to say, the specified number of generations and children at each split may be considered to be an average value that is achieved across the tree as a whole, whilst the actual number of generations in each path and the actual number of children may vary around this number. As an example, the average number of generations may be 10 and the average number of children may be 6. As another example, the average number of generations may be 50 and the average number of children may be 4. The extent of this variation may be specified in further parameters, such as parameters specifying minimum and maximum numbers of generations and/or children per split. Having generated an empty data structure for the splitting tree representing the desired pattern for transmitting the data through the network, the source node 210 can then assign intermediate nodes 230 to each node in the tree, thereby populating the data structure and fully defining the routes.

There are a wide range of factors that may be taken into consideration when determining the routes to be taken by each of the shares. In some cases, the intermediate nodes 230 for the routes may be randomly selected (in which case, it will be appreciated that there may be a small chance that two of the routes may turn out to be the same—although this is unlikely to be problematic as already discussed). However, in other cases various criteria may be used to select one or more, or all, of the intermediate nodes 230 that will be used. For example, the intermediate nodes 230 used in each route may be selected so as to minimise the risk of a sufficient number of shares being obtainable by an adversary by utilising an appropriate diversity in the routes taken by those shares.

For example, the geographic locations of the intermediate nodes 230(1) may form at least a part of the considerations for route determination. That is to say, the routes may be chosen so as to avoid too many shares (e.g. enough to recreate the data) traversing the same geographic area (albeit that they will necessarily need to converge towards the geographic location of the destination node 220 for the data to be transmitted to the destination node 220). Accordingly, where the intermediate nodes 230 are mobile, such as when the intermediate nodes 230 are provided by UAVs, the route determination may be based, at least in part, on the flight plans of the UAVs (which may, for example, be obtainable from a flight controller for the UAVs).

As another example, the plurality of intermediate nodes 230 may be operated by a number of different entities (or operators). That is to say, there may be a plurality of different operators, with each of the intermediate nodes 230 in the network 200 being operated by a respective operator. The determination of the routes at operation 420 may take into account the entities that are operating the intermediate nodes. That is to say, the routes may be chosen so as to avoid too many shares (e.g. enough to recreate the data) from traversing intermediate nodes belonging to the same operator. This can help prevent any individual operator from having a sufficient number of shares to recreate the data.

In some cases, the ability of each intermediate node 230 to communicate with other intermediate nodes 230 may be taken into consideration when selecting the intermediate nodes 230 for a route. That is to say, where an intermediate node 230 has been selected for one part of a route, the intermediate nodes for a preceding and/or succeeding step on that route may be selected to be intermediate nodes 230 with which that intermediate node 230 can communicate. For example, where the intermediate nodes 230 are provided by UAVs, the flight plans for those UAVs may be consulted to determine which other intermediate nodes they may be able to communicate with at any given time.

It will also be appreciated that the set of intermediate nodes 230 from which the intermediate nodes 230 for each route are selected may be limited to those with which the source node 210 has an encryption key for. That is to say, the network 200 may comprise other intermediate nodes 230 that could be used by other source nodes 210, that will not be used by source node 210 because it does not have an encryption key for them.

Where the network 200 comprises virtual network nodes as intermediate nodes 230, the routes may be determined in such a manner that the use of different virtual network nodes serves to further obfuscate the data passing through the physical network nodes providing those virtual network nodes. For example, an individual route may make use of different virtual network nodes that are provided by the same physical network nodes as separate intermediate nodes 230 in the route. This means that an individual route may in fact make multiple uses of the same physical network node without looping back to the same intermediate node 230 (i.e. the same virtual network node—which would also be a possibility). As another example, different routes may make use of the different virtual network nodes that are provided by the same physical network node as intermediate nodes 230 on that route. That means that two (or more) routes may in fact make use of the same physical network node despite not using the same intermediate node 230 provided by that physical network node. Through such uses of virtual network nodes, it is possible to further obfuscate the passage of data through the network, making it harder to piece together in the event that the physical network node is compromised. This is especially the case where addressing for the virtual network nodes is maintained externally from the physical network nodes. For example, where a mapping between virtual network nodes and the physical network node providing them is looked up from a remote service that is queried whenever data needs to be forwarded.

In some cases, the same share may be sent via multiple routes through the network 200. That is to say, redundant copies of the share may be transmitted, helping provide resilience in the event that there is disruption in the network 200. This can be achieved, for example by defining two parents (either direct or indirect) for a particular node in the splitting tree. A copy of the share may then be received from each parent.

In some cases, the same intermediate nodes 230 may appear more than once in a route for a particular share (e.g. they may appear more than once in different generations of the splitting tree that is defined such that the same node is a parent to itself in the tree). Indeed, it is generally expected (though by no means required) that this is the case.

Having determined the routes that each of the shares should take through the network 200, the method proceeds to an operation 430.

At operation 430, the method 400 constructs a datagram for transmitting the data through the network 200 along their respective routes. This datagram, which may be referred to as the initial datagram, comprises a plurality of encapsulated datagrams, whereby each datagram (i.e. both the initial datagram and the plurality of encapsulated datagrams) is intended to be processed by a respective intermediate node 230 in order to instruct that intermediate node 230 to participate in forwarding (at least some) of the plurality of shares along their respective routes to the destination node 220.

These datagrams can be constructed recursively, starting at the end of each route (i.e. by starting at the leaves of the tree structure formed by the routes and working back to the root). The respective datagrams for the terminal nodes in each route can be created by including respective data representing a share of the data to be transmitted along that route together with respective routing information that will instruct those nodes to transmit the data representing the share to the destination node 220. These datagrams are then encrypted using the respective cryptographic key for each of the terminal intermediate nodes. The construction of the next layer of the datagram can then begin by creating a respective datagram for the penultimate intermediate nodes 230 in each route, whereby the datagram that was created for each terminal node is included in the payload of the respective preceding penultimate intermediate node 230 in each route as an encapsulated datagram. The respective routing information for each of the datagrams intended for each of the penultimate intermediate nodes 230 is constructed to instruct those nodes to forward the payload (i.e. the encapsulated datagram) to the respective terminal intermediate node 230 in their route. This process can be continued, working back along each route one node at a time and encapsulating each datagram in the payload of the datagram intended for a preceding intermediate node 230 until the initial datagram, which is intended for processing by the first intermediate node (that is common to all routes), is reached. During the construction of the datagrams, any initial portion of each route which is common to one or more of the other routes is combined, such that only a single datagram is created for each intermediate node on that common initial portion. This is achieved by encapsulating the datagrams for each of the routes in the payload of the last intermediate node 230 that they have in common (i.e. the last intermediate node 230 in the common initial portion of the route—or, in other words, at the branching points within the tree structure formed by the routes as a whole). At the very least, each route shares the first intermediate node 230 and so, will be joined in the payload of the initial datagram. However, where two (or more routes), share a larger initial portion (i.e. more than just the first intermediate node 230) in common, this joining may occur later on in those routes. Accordingly, at least one of the datagrams that is constructed will include a plurality of encapsulated datagrams in its payload. The routing information that is constructed for each such datagram will include routing information for each of the encapsulated payloads to instruct the intermediate node 230 that processes the datagram to forward (or relay or transmit) each of the plurality of encapsulated datagrams on to a different respective intermediate node 230 in the network 200. When such a datagram is processed by an intermediate node 230, it results in a forking of the data following that intermediate node 230 to allow the different parts of the data to follow the different routes as they diverge after that point.

The data that is to be transmitted to the destination node 220 is labelled with additional metadata to allow the source to reconstruct them. For example, it may be labelled with an ID, and an indication of a share number and a total number of shares (e.g. "share x of y"), as well as, in some cases, an indication of a threshold number of share required to regenerate the transmitted data. This metadata is encrypted with the share in the payload of the last intermediate nodes on each route.

Although it is generally anticipated that the datagrams for all of the intermediate nodes in the common initial portion between any two routes are combined into a single datagram for each intermediate node so as to minimise the amount of processing and number of datagrams present in the network 200, it will be appreciated that this isn't strictly necessary (provided that ultimately the datagrams are packaged into a single initial datagram). Accordingly, in some cases, some of the intermediate nodes in a common initial portion may be disregarded for the purposes of combining the datagrams, in which case separate datagrams, one for each route, will remain present for those disregarded intermediate nodes in the common initial portion of those routes.

Accordingly, through the creation of a plurality of datagrams designed to instruct the intermediate nodes 230 to convey the shares representing along different paths and the recursive encapsulation of these datagrams as described above, a single datagram is created (the initial datagram) which will cause the intermediate nodes 230 of the network to forward the information and the desired manner. This allows the source node 210 to control how the data is sent through the network in a fine-grained manner. Having constructed the initial datagram, the method proceeds to an operation 440.

At operation 440, the method 400 transmits the initial datagram 510(1) to the first intermediate node 230(1), thereby triggering the transmission of the data through the network 200 to the destination node 220.

Having transmitted the initial datagram to the first intermediate node 230(1), the method 400 ends. As will be appreciated, it is desirable (though not essential) for a different routing pattern to be used for subsequent data being transmitted between the same source node 210 and destination node 220. For example, the splitting tree upon which the datagrams are constructed may be regenerated regularly (and independently from any previous splitting tree) for each new communication between the same source node 210 and destination node 220. This may help improve the security of communications between the source node 210 and destination node 220.

Figure 5:
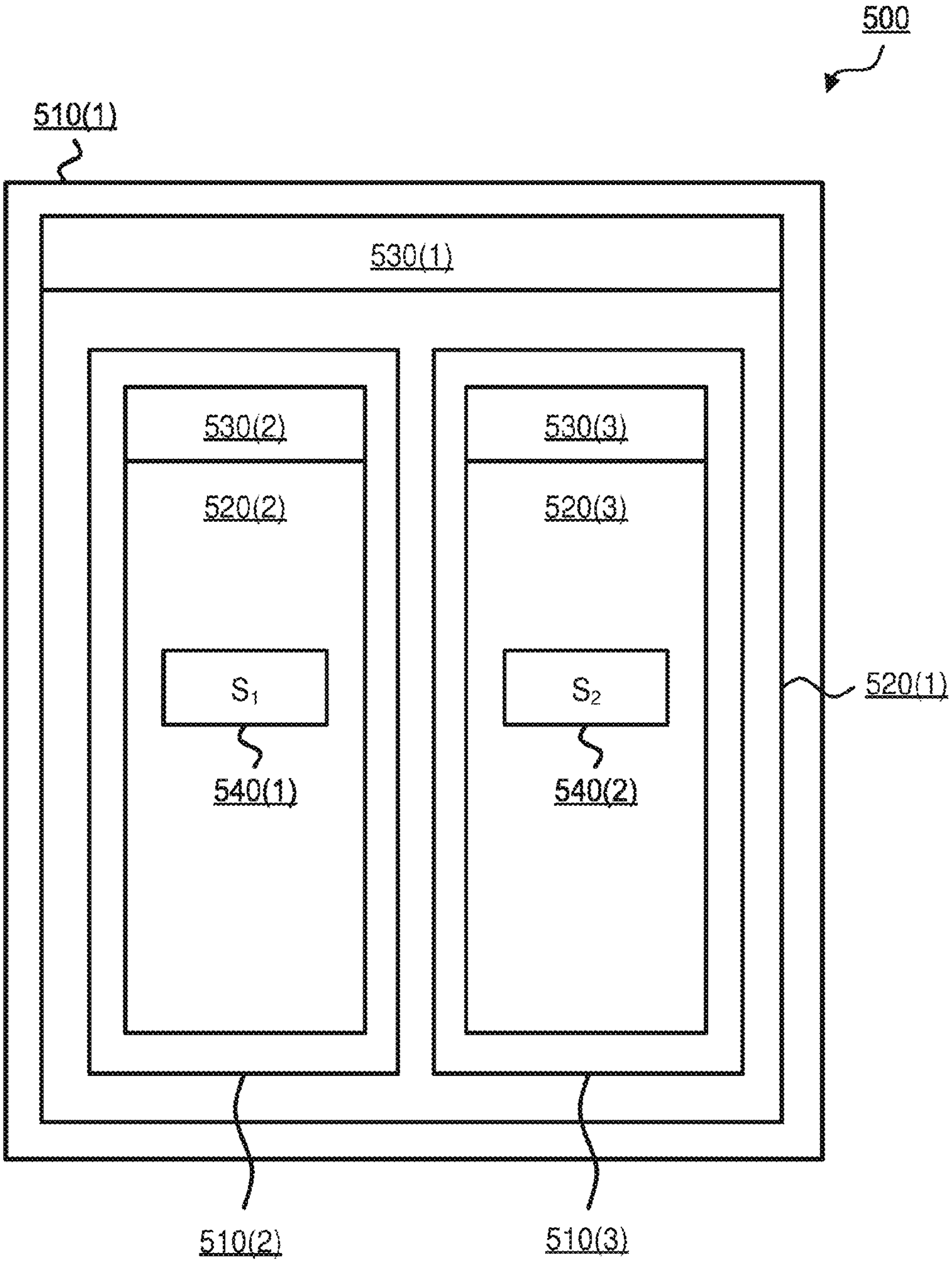
FIG. 5 is a diagrammatic representation of an example datagram constructed according to embodiments of the present invention.

FIG. 5 is a diagrammatic representation 500 of an example datagram 510(1) constructed according to embodiments of the present invention. In this example, there are three datagrams 510 that have been constructed, an initial (or outer) datagram 510(1) and two encapsulated (or innermost) datagrams 510(2) and 510(3). As discussed above, each of the datagrams 510 is encrypted with a cryptographic key for the respective intermediate node 230 that is intended to process that datagram. Accordingly, on receipt of a datagram 510, an intermediate node 230 can decrypt the datagram to reveal a payload 520 and routing information 530 contained therein.

Figure 6:
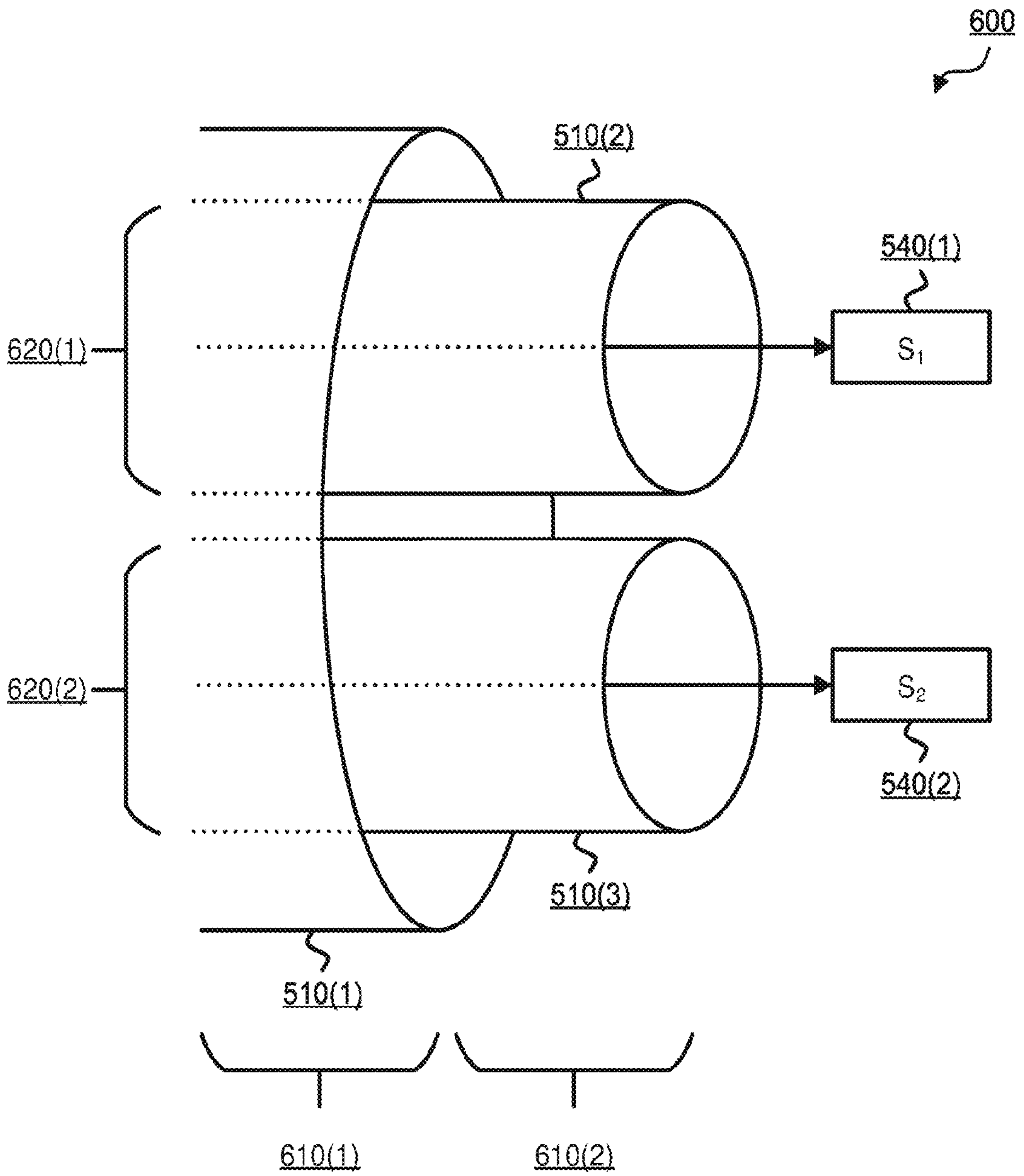
FIG. 6 is an alternative diagrammatic representation of the example datagram illustrated in FIG. 5.

FIG. 6 is an alternative diagrammatic representation 600 of the example datagram illustrated in FIG. 5. This representation 600 shows the various layers 610 and cores 620 that are created by the example datagram 510(1). As can be seen, this example datagram defines two layers 610(1) and 610(2) and two cores 620(1) and 620(2). The first layer 610(1) is defined by the first datagram 510(1), whilst the second layer is defined by the two encapsulated datagrams 510(2) and 510(3), which also serve to define the two cores 620(1) and 620(2) respectively. The two cores 620(1) define two separate routes through the network 200, one for each of the shares $S_1$ and $S_2$.

Figure 7:
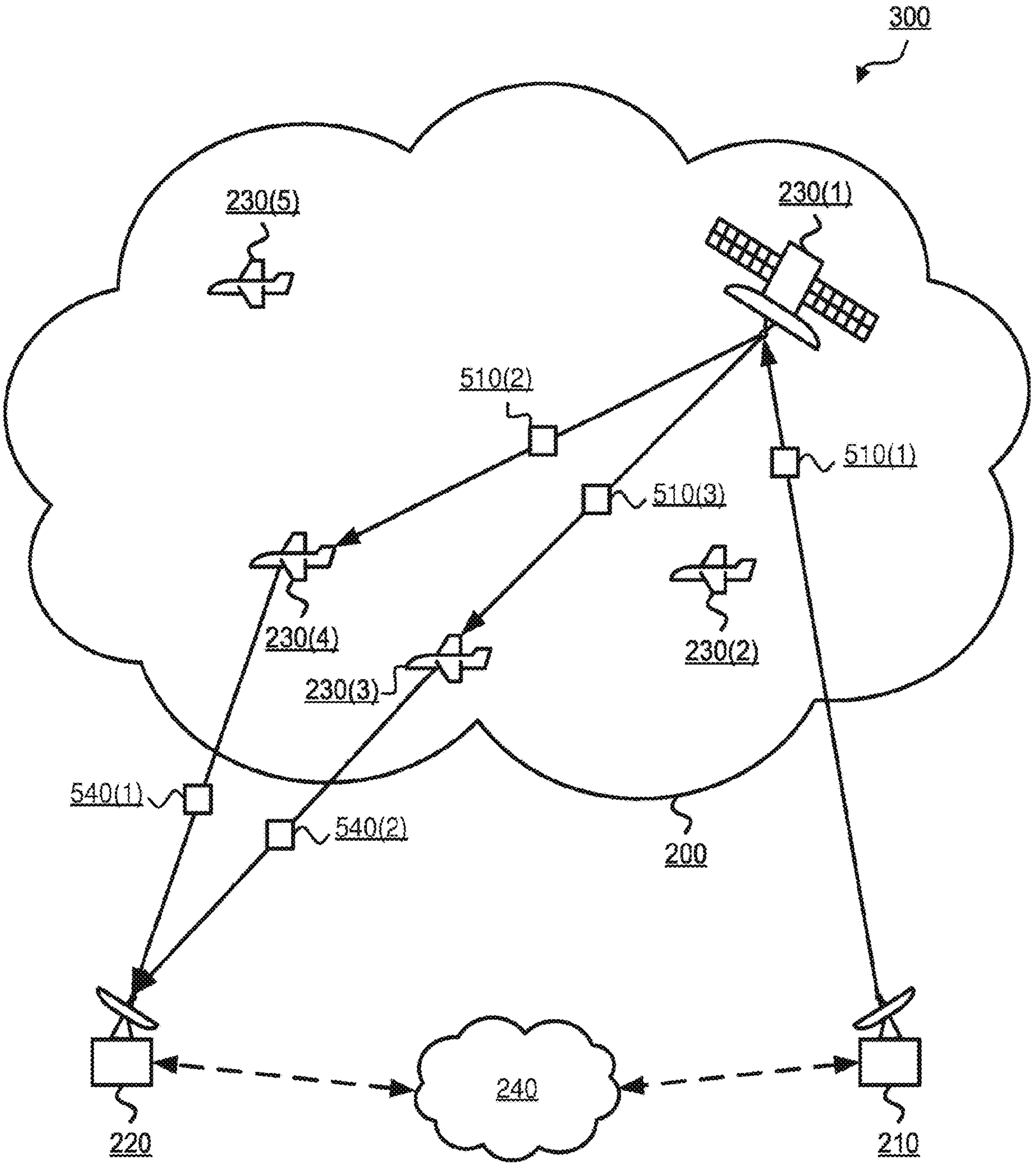
FIG. 7 is a diagrammatic representation showing the routes intended to be used to convey data through the network for the example datagram shown in FIGS. 5 and 6.

FIG. 7 is a diagrammatic representation showing the routes intended to be used to convey data through the network 200 for the example datagram 510(1) shown in FIGS. 5 and 6. As can be seen, there are two routes that have been defined (at operation 420 of the method 400) for conveying the data through the network 200. A first route, defined by the first core 620(1) to convey the data 540(1) representing the first share $S_1$, involves the intermediate nodes 230(1) and 230(4). Meanwhile, a second route, defined by the second core 620(2) to convey the data 540(2) representing the second share $S_2$, involves the intermediate nodes 230(1) and 230(3).

Figure 8:
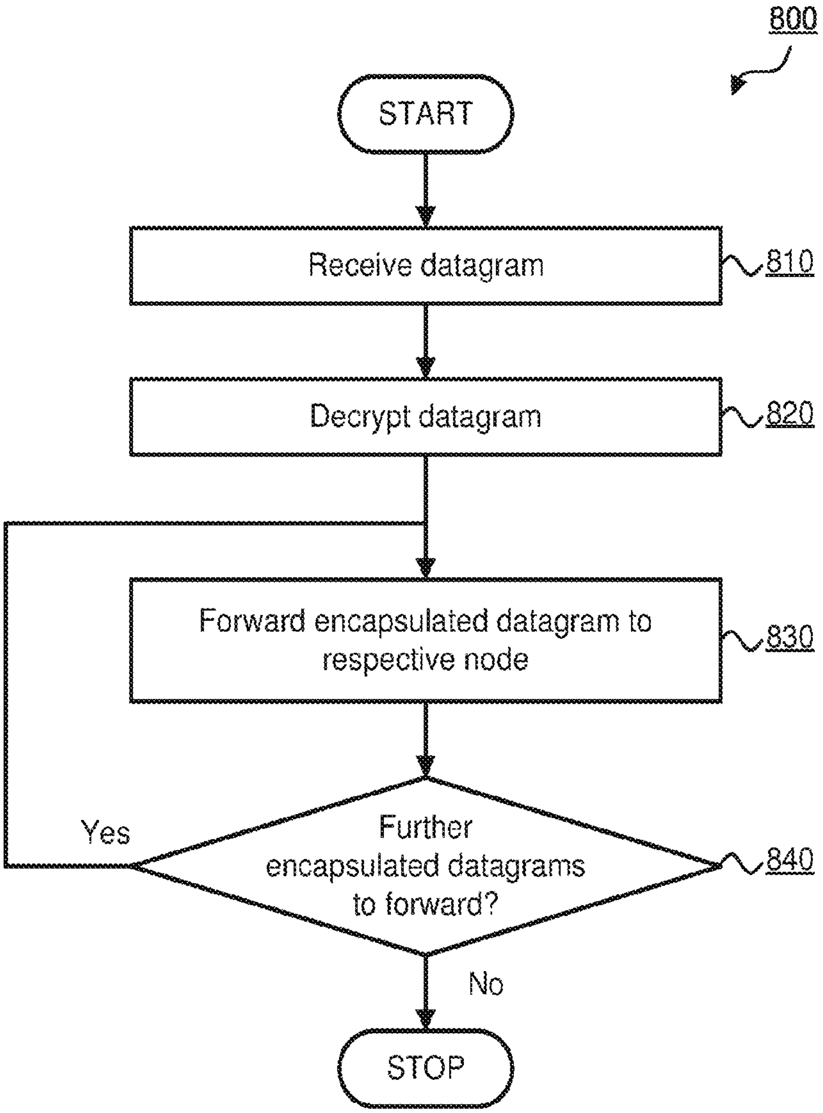
FIG. 8 is a flowchart illustrating a method of transmitting data through a network that is performed by the intermediate nodes in the network to facilitate the transmission of data through the network from a source node to a destination node.

FIG. 8 is a flowchart illustrating a method 800 of transmitting data through a network that is performed by the intermediate nodes 230 in the network to facilitate the transmission of data through the network from a source node 210 to a destination node 220.

An operation 810, the method 800 receives a datagram, such as the example datagram 510 discussed in relation to FIGS. 5, 6 and 7. The datagram is encrypted using a key associated with the intermediate node 230. Having received the datagram 510, the method 800 proceeds to an operation 820.

At operation 820, the method 800 decrypts the datagram 510 using its key, thereby creating a decrypted datagram. The decrypted datagram includes a payload 520 and routing information 530. The payload 520 includes one or more encapsulated datagrams that are encrypted using the keys for other intermediate nodes 230 to which those datagrams are to be forwarded. Where the intermediate node 230 is the last node in the route for a particular share $S_n$, as discussed above, the encapsulated datagram is data 540 representing the share $S_n$ that is to be provided to the destination node 220. In some cases, this data 540 may simply be the share $S_n$ itself. However, in other cases, the data 540 may be an encrypted version of the share $S_n$ (e.g. encrypted using a public key for the destination node 220) which the destination node can decrypt to obtain the share $S_n$. The routing information 530 provides instructions to the intermediate node 230 as to how the encapsulated datagram(s) should be handled—that is, which node they should be forwarded (or relayed) on to. Where a plurality of encapsulated datagrams are present in the decrypted datagram, the routing information 530 includes respective routing information for each encapsulated datagram, such that each encapsulated datagram can be routed differently from the other encapsulated datagrams. Having decrypted the received datagram 510, the method 800 proceeds to an operation 830.

At operation 830, the method 800 forwards an encapsulated datagram to the respective node that it is intended for (either the destination node 220 or another intermediate node 230), as indicated by the routing information 530. As already discussed, where the intermediate node 230 is provided by a mobile entity, such as a UAV, this may involve waiting until the intermediate node 230 is in communication with the intended recipient node. Having communicated the encapsulated datagram to its intended recipient node, the method 800 proceeds to an operation 840.

At operation 840, the method 800 determines whether there are further encapsulated datagrams contained in the decrypted datagram that also need to be forwarded (or relayed). If so, the method 800 reiterates back to carry out operation 820 in respect of each such encapsulated datagram, forwarding each of them onto their respective intended recipient nodes as indicated by the routing information 530(2) and 530(3) associated with each encapsulated datagram 510(2) and 510(3). In some cases, the intermediate node 230 may apply a random, variable time delay before transmitting each of the encapsulated datagrams.

Once all of the encapsulated datagrams contained in the decrypted datagram have been forwarded, the method 800 ends. Of course, although not shown in FIG. 8, the method 800 may be continually performed by each of the intermediate nodes 230, such that instead of ending, the method 800 may reiterate back to operation 810 to await a new datagram for processing. Similarly, multiple instances of method 800 may be performed by an intermediate node 230 simultaneously (or substantially simultaneously) to handle multiple datagrams at once (possible for many different source nodes 210). Furthermore, where the intermediate nodes 230 may also function as destination nodes 220 for other communications via the network 200, the intermediate nodes 230 may check whether they are themselves the destination node 220 for the received datagram (and, if so, may act on the datagram appropriately).

Returning to the example datagram discussed in relation to FIGS. 5, 6 and 7, in this example, having constructed the initial datagram 510(1) which includes, as encapsulated datagrams, all the necessary instructions for instructing the intermediate nodes 230 of the network 200 to forward the shares representing the data to be transmitted to the destination node 220 along the desired different routes, the source node 210 forwards the initial datagram 510(1) to a first intermediate node 230(1) that is common to all routes, in this case the intermediate node 230(1) is provided by the satellite (although in other cases, a different type of component, such as a UAV, may be used to provide the first intermediate node 230(1)).

Upon receipt of the initial datagram 510(1), the satellite decrypts the datagram 510(1) using its cryptographic key to reveal the two encapsulated datagrams 510(2) and 510(3). The first intermediate node 230(1) follows the routing information 530(1) relating to the first encapsulated datagram 510(2) and transmits the first encapsulated datagram 510(2) to the fourth intermediate node 230(4) accordingly. The first intermediate node 230(1) also follows the routing information 530(1) relating to the second encapsulated datagram 510(3) and transmits the second encapsulated datagram 510(3) to the third intermediate node 230(3) accordingly.

Upon receipt of the first encapsulated datagram 510(2), the fourth intermediate node 230(4) decrypts the received datagram using its cryptographic key to unveil a payload 520(2) containing data 540(1) representing the first share $S_1$, as well as routing information 530(2). The fourth intermediate node 230(4) refers to the routing information 530(2) and forwards the data 540(1) representing the first shares $S_1$ to the destination node 220 accordingly.

Similarly, upon receipt of the second encapsulated datagram 510(2), the third intermediate node 230(3) decrypts the received datagram using its cryptographic key to unveil a payload 520(3) containing data 540(2) representing the second share $S_2$, as well as routing information 530(3). The third intermediate node 230(3) refers to the routing information 530(2) and forwards the data 540(2) representing the second secret $S_2$ to the destination node 220 accordingly.

Having received both shares $S_1$ and $S_2$, the destination node 220 is then able to reconstruct the original data represented by those shares in accordance with the secret sharing algorithm. In some cases, the data 540 that is received for each share may further comprise information to assist the destination node 220 in assembling the original data. For example, an identifier for each share may be provided together with an indication of the identifiers for all of the shares that need combining in order to reassemble the original data. Similarly, information about the secret sharing threshold that was used may also be included (i.e. the minimum number of shares that need to be combined to generate the original data). An identity of the source node 210 may also be included. However, in other cases, this information may be provided by alternative means, such as by using the other network 240 connecting the source node 210 and destination node 220.

Conceptually this is similar to a so-called onion routing datagram in that the data to be transmitted is wrapped in multiple 'layers' 610 of encapsulation to create a number of encrypted layers that are 'peeled' off in turn by respective intermediate nodes (or relays) as the data is forwarded through the network. However, in contrast to conventional onion routing, the payload 520 of at least one of the datagrams 510 comprises a plurality of encapsulated datagrams, whilst the respective routing information 530 for each such datagram 510 instructs the intermediate node 230 that is to process that datagram to forward each of the encapsulated datagrams to different respective intermediate nodes 230 in the network 200. The inclusion of such datagrams 510 cause the data being transmitted to be dispersed across multiple routes within the network 200. These datagrams 510 may therefore be referred to as 'split' datagrams or layers in the onion datagram and result in an onion datagram having multiple 'cores' (i.e. a 'multi-core onion'). Each of the shares, which collectively represent the data to be transmitted through the network 200, are packaged into their own respective 'core' 620 of the datagram which defines a distinct route through the network 200 through which that share $S_n$ will be transmitted.

During transmission of the data the amount of information that each of the intermediate nodes 230 has about the data being transmitted through the network is limited. For example, the intermediate nodes 230 only know the proximate source and proximate destination of the datagram 510 they are processing (i.e. the nodes immediately before and after them in the route) and not the ultimate source or destination. Of course, in some cases, where the datagrams for each intermediate node 230 are encrypted using symmetric encryption, the datagrams may further include an indication of which cryptographic key should be used to process the datagram. Although it is acknowledged that this will result in the intermediate nodes having more information (i.e. an identity of the ultimate source node 210), this may be outweighed by the better level of transmission security that can be achieved, as already discussed. Furthermore, the intermediate nodes 230 are also unaware of any datagrams that exist outside of same 'core' as they datagram that they are processing. That is to say, following the processing of a 'split' layer of the initial datagram 510(1), the recipients of each of the plurality of encapsulated datagrams contained therein are unaware of the existence of the other encapsulated datagrams. Accordingly, by transmitting the data in this manner, the intermediate nodes 230 are prevented from having too much information about the data being transmitted, helping to secure the data from being disclosed in the event that one or more of the intermediate nodes 230 is compromised. In particular, although the outer 'layers' of the datagram (e.g. the initial datagram 510(1)) do convey all (or a greater portion) of the data being transmitted, this is nested in multiple layers of encryption (through the encapsulated datagrams). Therefore, even if an intermediate node 230 early in the route is compromised, it will not be possible to recover the data without having access to the keys of all the other intermediate nodes 230 in the route (thereby requiring a large number of intermediate nodes 230 to be compromised). Meanwhile, although the inner 'layers' of the datagram (e.g. the encapsulated datagrams 510(2) and 510(3)) have fewer layers of encryption protecting the data that they are conveying to the destination node 220, this is counterbalanced by the fact that they only convey a portion of the data (such as an individual share). Accordingly, even if an intermediate node 230 at the end of a route is compromised, it will not be possible to recover the data without having access to the data at the intermediate nodes 230 that form the other endpoints for the routes through the network defined by the initial datagram 210(1). Furthermore, it is not possible from the data available at one intermediate node 230 forming the endpoint of one route to work out where the other route endpoints are (or indeed to even determine the existence/number of other route endpoints).

The example datagram discussed in relation to FIGS. 5, 6 and 7 is a simple example intended merely to illustrate the operation of the invention. It will be appreciated that this technique can be used to create much more complex routing arrangements, as desired by the source node 210 (e.g. to achieve particular security requirements). For example, the data to be transmitted may be split into more than two shares, with the number of cores 620 being defined by the datagram being increased accordingly. Similarly, more layers 610 of encapsulation may be used to define longer routes. Furthermore, the routes themselves may include loops, with the same intermediate node 230 appearing two or more times in the same route via which a particular share is to be transmitted. Such adjustments may help to improve the security of the data transmission by further dispersing it through the network and/or obfuscating the routes that are taken. Some further example datagrams constructed according to the invention will now be discussed to help illustrate some of the patterns of routing that may occur. However, it should be noted that these too are simple examples and that it is expected that greater complexity (e.g. in terms of numbers of shares and their associated cores, number of layers and/or routing patterns) is likely to be used in most applications.

Figure 9:
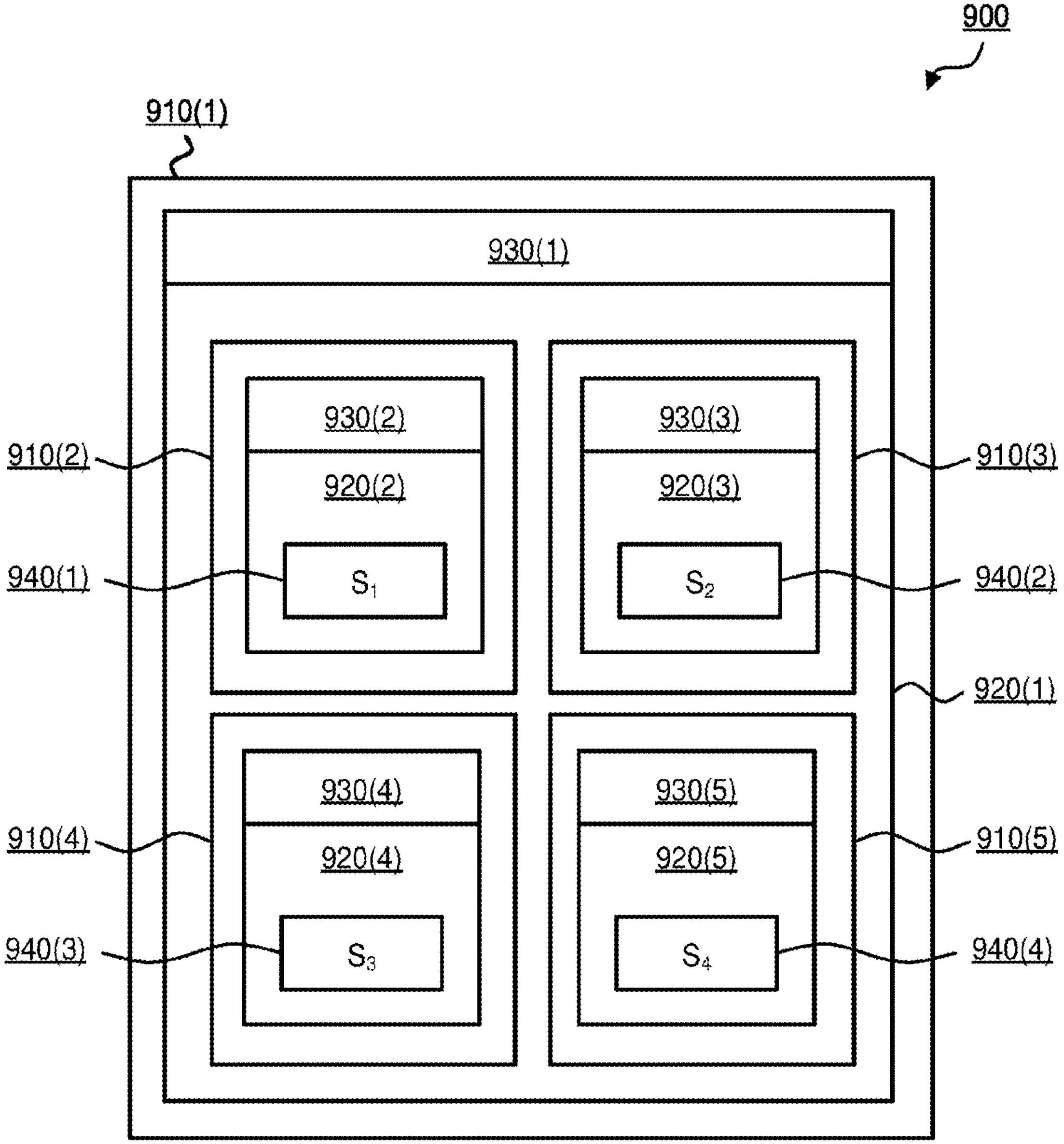
FIG. 9 is a diagrammatic representation of another example datagram constructed according to embodiments of the present invention.

FIG. 9 is a diagrammatic representation 900 of another example datagram 910(1) constructed according to embodiments of the present invention. In this example, the data to be transmitted has been split into four shares $S_1$, $S_2$, $S_3$ and $S_4$ and there are five datagrams 910 that have been constructed, namely an initial datagram 910(1) and four encapsulated datagrams 910(2), 910(3), 910(4) and 910(5). Again, each of the datagrams 910 has its own respective payload 920 and routing information 930 and is encrypted using a cryptographic key that is associated with the intermediate node 230 that is intended to process that datagram 910.

Figure 10:
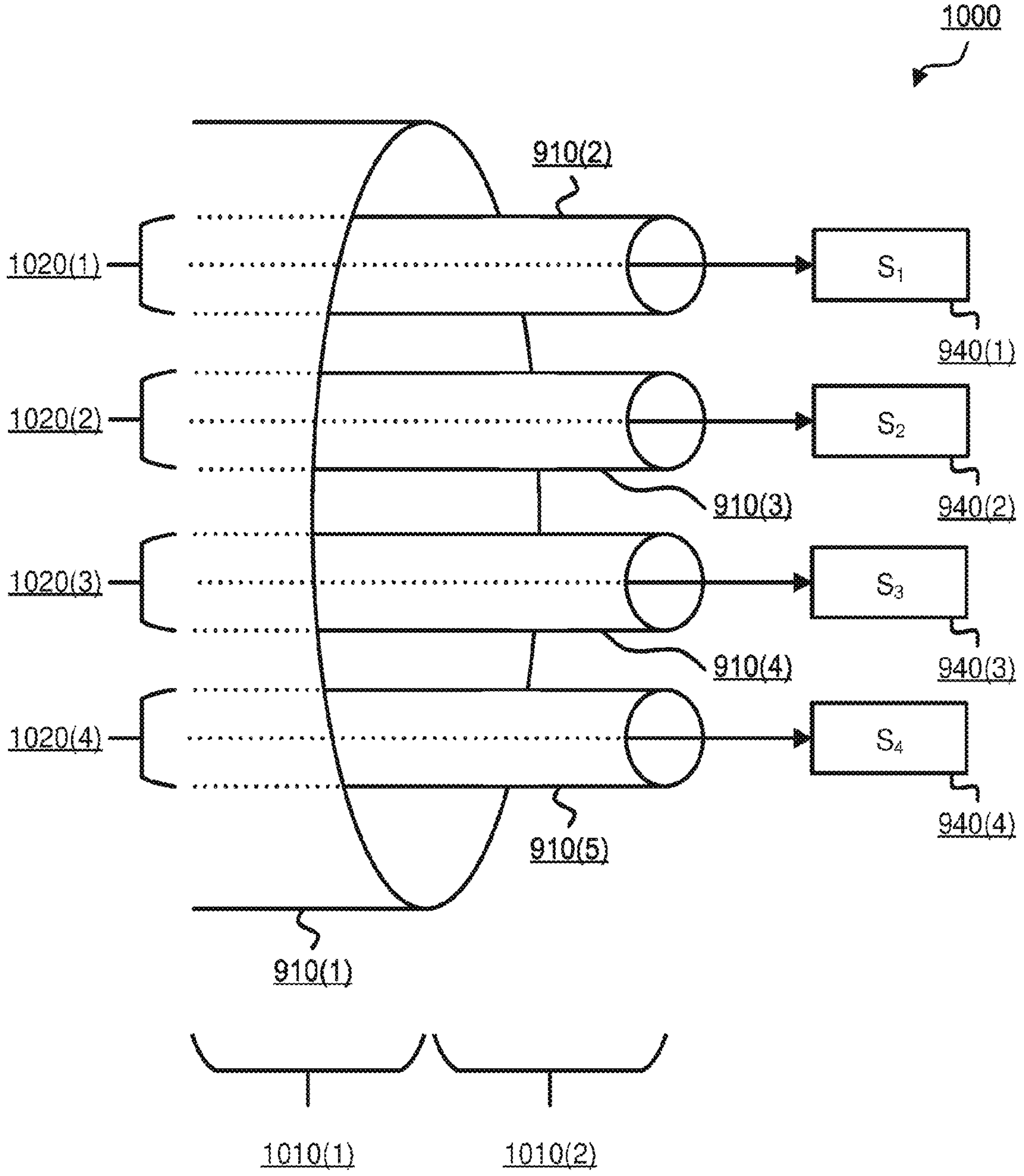
FIG. 10 is an alternative diagrammatic representation of the structure of the example datagram shown in FIG. 9.

FIG. 10 is an alternative diagrammatic representation 1000 of the structure of the example datagram 910(1) shown in FIG. 9. As can be seen, the 'split onion' structure provided by this datagram results in an onion having two 'layers' 1010 and four 'cores' 1020, one 'core' for each of the shares $S_1$, $S_2$, $S_3$ and $S_4$. Accordingly, the datagram defines four different routes through the network, each route being defined by a separate 'core' 1020 for a particular one of the shares.

Figure 11:
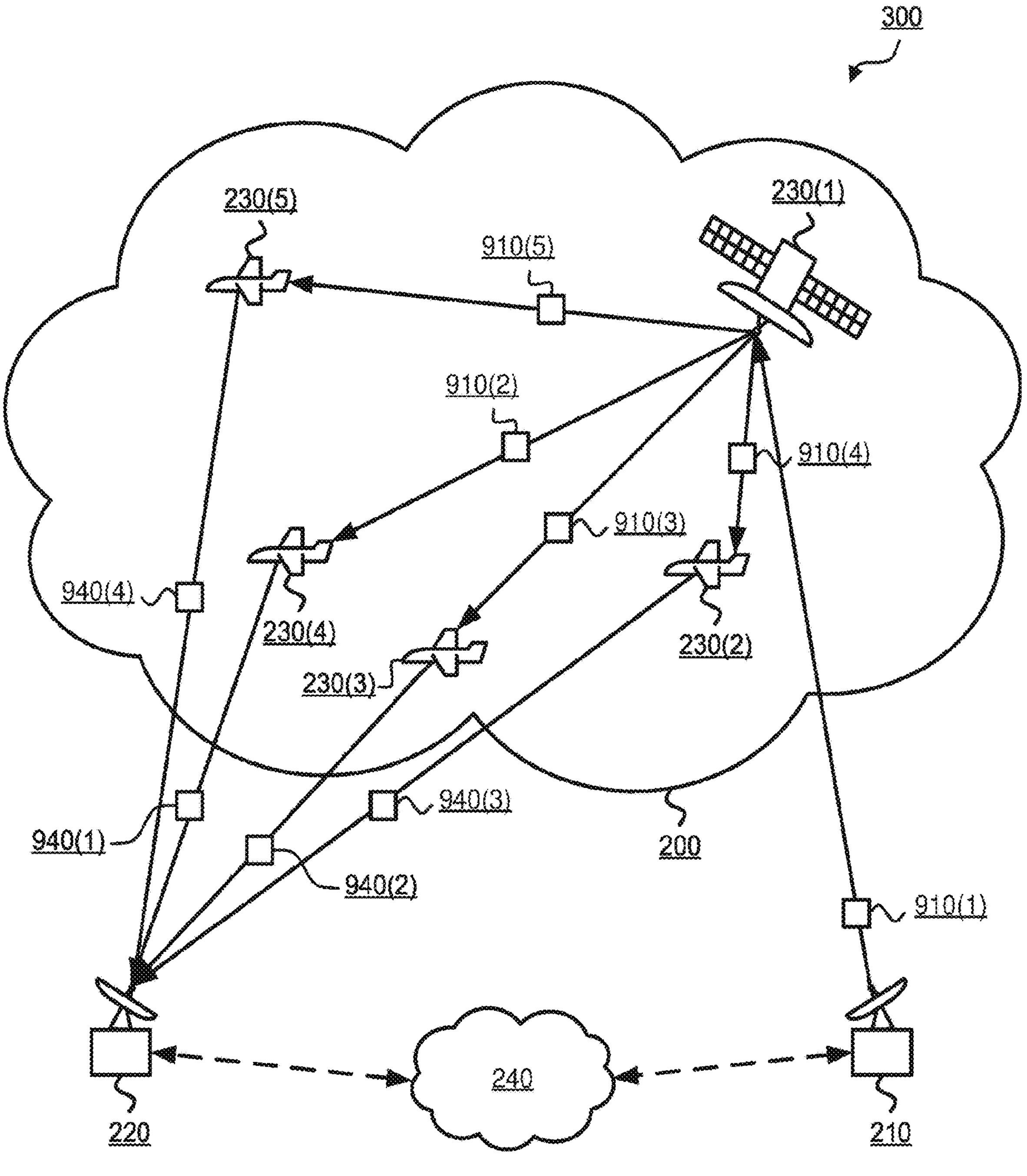
FIG. 11 is a diagrammatic representation showing the routes that will be used to convey the data through the network for the initial datagram shown in FIGS. 9 and 10.

FIG. 11 is a diagrammatic representation showing the routes that will be used to convey the data through the network 200 for the initial datagram 910(1) shown in FIGS. 9 and 10. A first route, defined by the first core 1020(1) for the first share $S_1$, involves the first and fourth intermediate nodes 230(1) and 230(4). A second route, defined by the second core 1020(2) for the second share $S_2$, involves the first and third intermediate nodes 230(1) and 230(3). A third route, defined by the third core 1020(3) for the third share $S_3$, involves the first and second intermediate nodes 230(1) and 230(2). Meanwhile, a fourth route, defined by the fourth core 1020(4) for the fourth share $S_4$, involves the first and fifth intermediate nodes 230(1) and 230(5).

When the initial datagram 910(1) is transmitted to the first intermediate node 230(1), the first intermediate node 230(1) decrypts the datagram 910(1) using its cryptographic key to reveal the four encapsulated datagrams 910(2), 910(3), 910(4) and 910(5). The first intermediate node 230(1) follows the routing information 930(1) relating to each of the encapsulated datagrams 910(2), 910(3), 910(4) and 910(5) and forwards them to their intended recipient intermediate nodes 230(4), 230(3), 230(2) and 230(5) respectively.

Upon receipt of their respective datagrams 910(4), 910(3), 910(2) and 910(5), the second, third, fourth and fifth intermediate nodes 230(2), 230(3), 230(4) and 230(5) each decrypt their respective received datagram using their respective cryptographic key to unveil a respective payload 920(4), 920(3), 920(2) and 920(5). The payload 920(4) unveiled by the second intermediate node 230(2) contains data 940(3) representing the third share $S_3$. The payload 920(3) unveiled by the third intermediate node 230(3)

contains data 940(2) representing the second share $S_2$. The payload 920(2) unveiled by the fourth intermediate node 230(4) contains data 940(1) representing the first share $S_1$. Meanwhile, the payload 920(5) unveiled by the fifth intermediate node 230(5) contains data 940(4) representing the fourth share $S_4$. In addition to unveiling a payload 920, the decryption of the respective datagrams 910(4), 910(3), 910(2) and 910(5) by the second, third, fourth and fifth intermediate nodes 230(2), 230(3), 230(4) and 230(5) also unveils respective routing information 930(4), 930(3), 930(2) and 930(5), instructing each of the second, third, fourth and fifth intermediate nodes 230(2), 230(3), 230(4) and 230(5) to forward their respective data 940(3), 940(2), 940(1) and 940(4) to the destination node 220. The second, third, fourth and fifth intermediate nodes 230(2), 230(3), 230(4) and 230(5) to transmit their respective data 940(3), 940(2), 940(1) and 940(4) to the destination node 220 in accordance with the routing information 930(4), 930(3), 930(2) and 930(5).

Having received all the shares $S_1$, $S_2$, $S_3$ and $S_4$, the destination node 220 is then able to reconstruct the original data represented by those shares in accordance with the secret sharing algorithm.

Since more than two shares are used to convey the data, it is possible to introduce redundancy into the system by using an appropriate threshold for the secret sharing algorithm. As already discussed, where the threshold is specified to be lower than the total number of shares, the original data can be recreated from a subset of the shares (provided it has at least the threshold number of shares). For example, in the example discussed above in relation to FIGS. 9, 10 and 11, a secret sharing threshold of three could be used, meaning that the original data can be recreated from any three of the shares $S_1$, $S_2$, $S_3$ and $S_4$. Accordingly, it is not necessary for all of the shares to reach the destination node 220 and the destination node 220 can recreate the data after three shares have been received.

Where such a threshold is used, the routing information 930 associated with a 'split layer' in the datagram (i.e. a datagram that includes a plurality of encapsulated datagrams in its payload) may indicate a number of datagrams that must be forwarded (i.e. a minimum forwarding threshold). Returning again to the example discussed in relation to FIGS. 9, 10 and 11, for example, the routing information 930(1) for the initial datagram 910(1) may instruct the first intermediate node 230(1) that at least three of the encapsulated datagrams must be forwarded. Accordingly, the satellite may decide to stop forwarding any further encapsulated datagrams after that number of encapsulated datagrams have been successfully forwarded (e.g. if only 3 of the intermediate nodes 230(2), 230(3), 230(4) and 230(5) involved in the second layer 1010(2) of the datagram are currently in communication range). Of course, it will be appreciated that in more complex datagrams, where multiple 'split' layers are present, care will need to be taken when determining the respective minimum forwarding thresholds for each such layer, to ensure that at least the threshold number of shares will reach the destination node 220, even if each intermediate node 230 processing a 'split' layer were to only forward the minimum number of encapsulated packets specified by their respective minimum forwarding thresholds.

Figure 12:
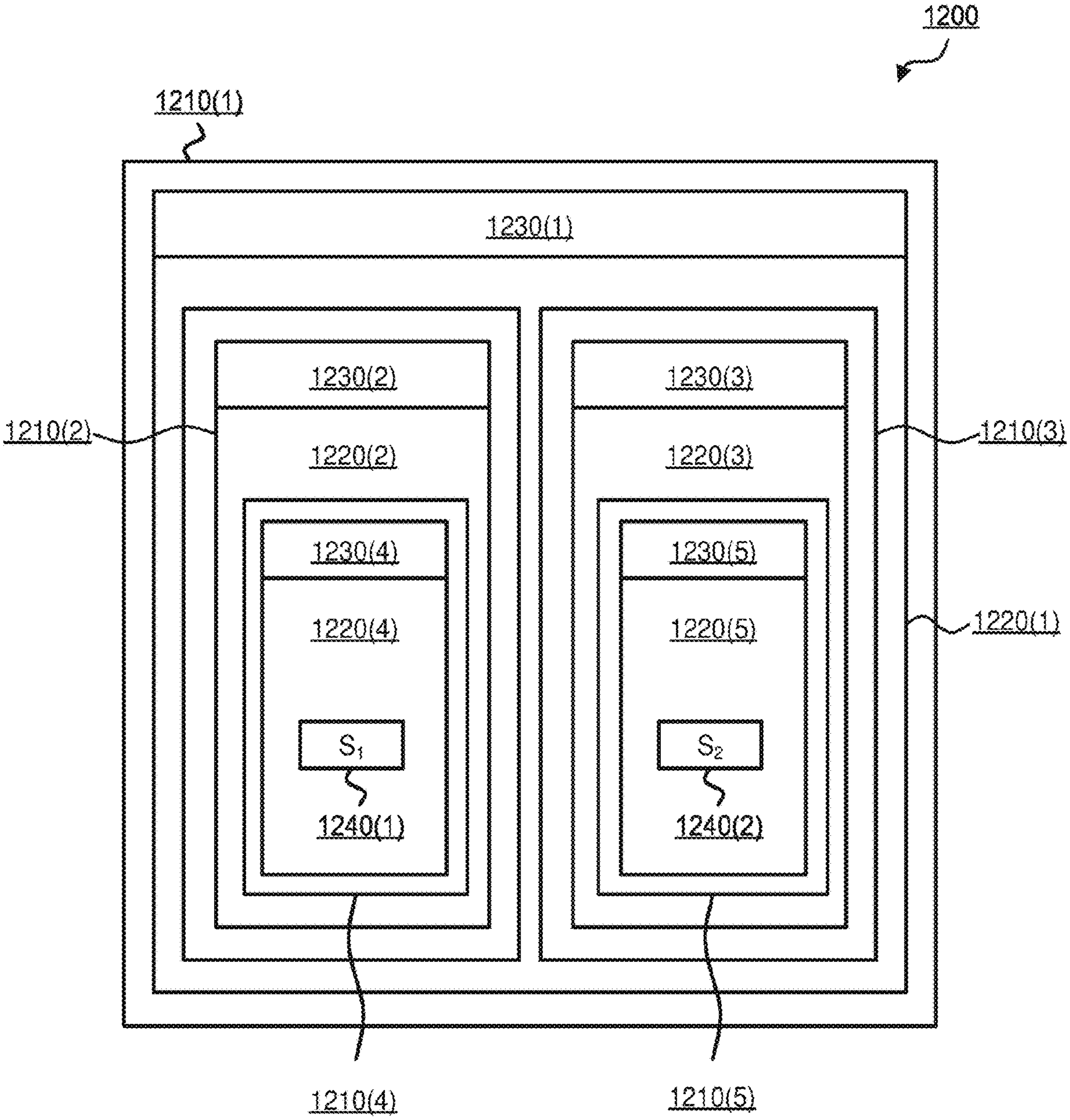
FIG. 12 is a diagrammatic representation of yet another example datagram constructed according to embodiments of the present invention.

FIG. 12 is a diagrammatic representation 1200 of yet another example datagram 1210(1) constructed according to embodiments of the present invention. In this example, there are also five datagrams 1210 that have been constructed, an initial datagram 1210(1) and four encapsulated datagrams 1210(2), 1210(3), 1210(4) and 1210(5). However, in this example, two of the encapsulated datagrams 1210(4) and 1210(5) are encapsulated inside two other encapsulated datagrams 1210(2) and 1210(3) respectively, which are encapsulated inside the initial datagram 1210(1). Accordingly, although all the datagrams are encapsulated inside the initial datagram 1210(1), only two of the datagrams 1210(2) and 1210(3) are directly encapsulated inside the initial datagram 1210(1). The other two encapsulated datagrams 1210(4) and 1210(5) are indirectly encapsulated in the initial datagram 1210(1) by virtue of their encapsulation inside the other two datagrams 1210(2) and 1210(3) respectively. Again, each of the datagrams has its own respective payload 1220 and routing information 1230 and is encrypted using a cryptographic key that is associated with the intermediate node 230 that is intended to process that datagram 1210.

Figure 13:
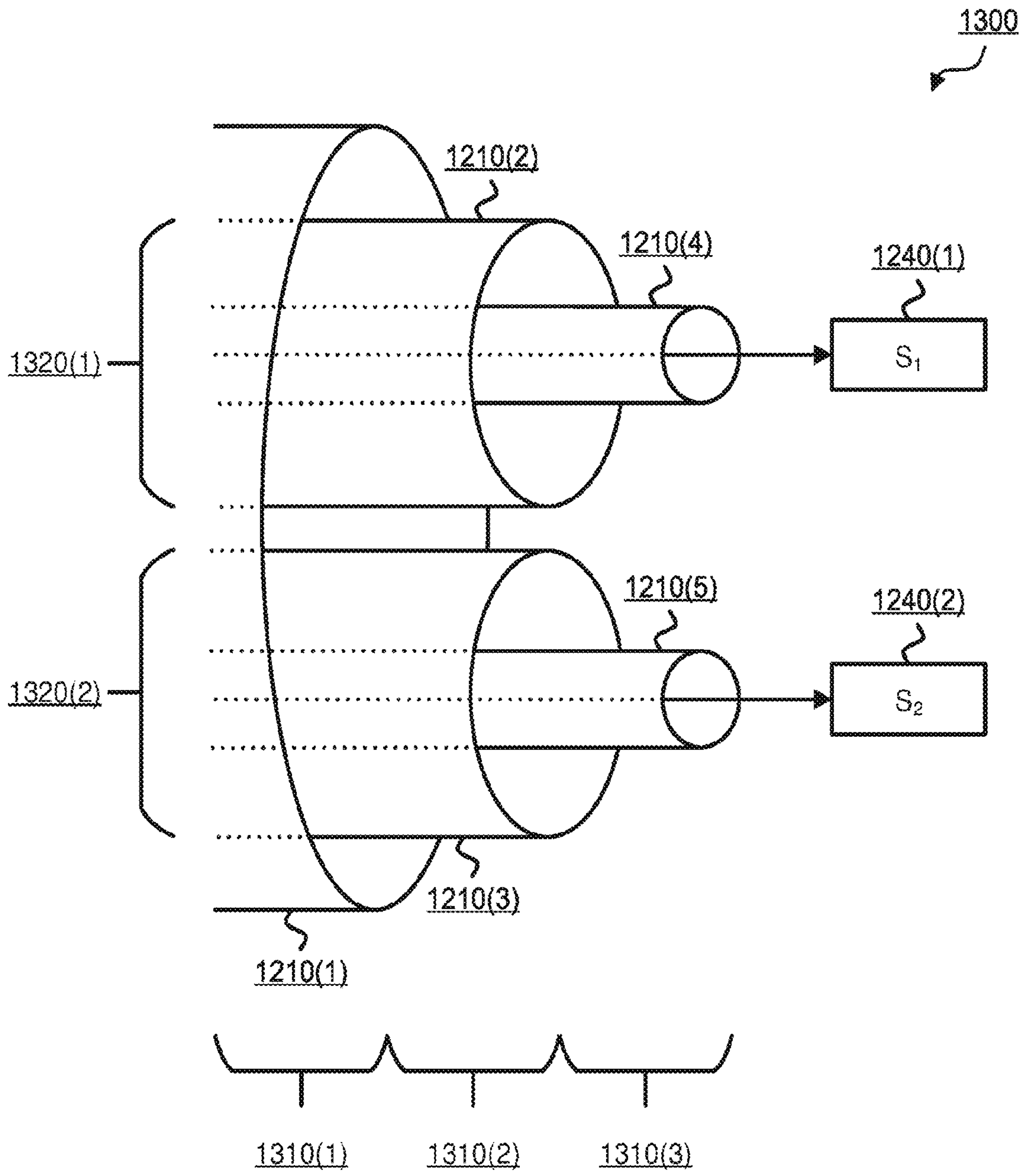
FIG. 13 is an alternative diagrammatic representation of the structure of the example datagram shown in FIG. 12.

FIG. 13 is an alternative diagrammatic representation 1300 of the structure of the example datagram 1210(1) shown in FIG. 12. As can be seen, in the example, the datagram defines three 'layers' 1310 and two 'cores' 1320, one 'core' for each of the shares $S_1$ and $S_2$. Accordingly, the datagram defines two different routes through the network 200, each route being defined by a separate 'core' 1320 for a particular one of the shares.

Figure 14:
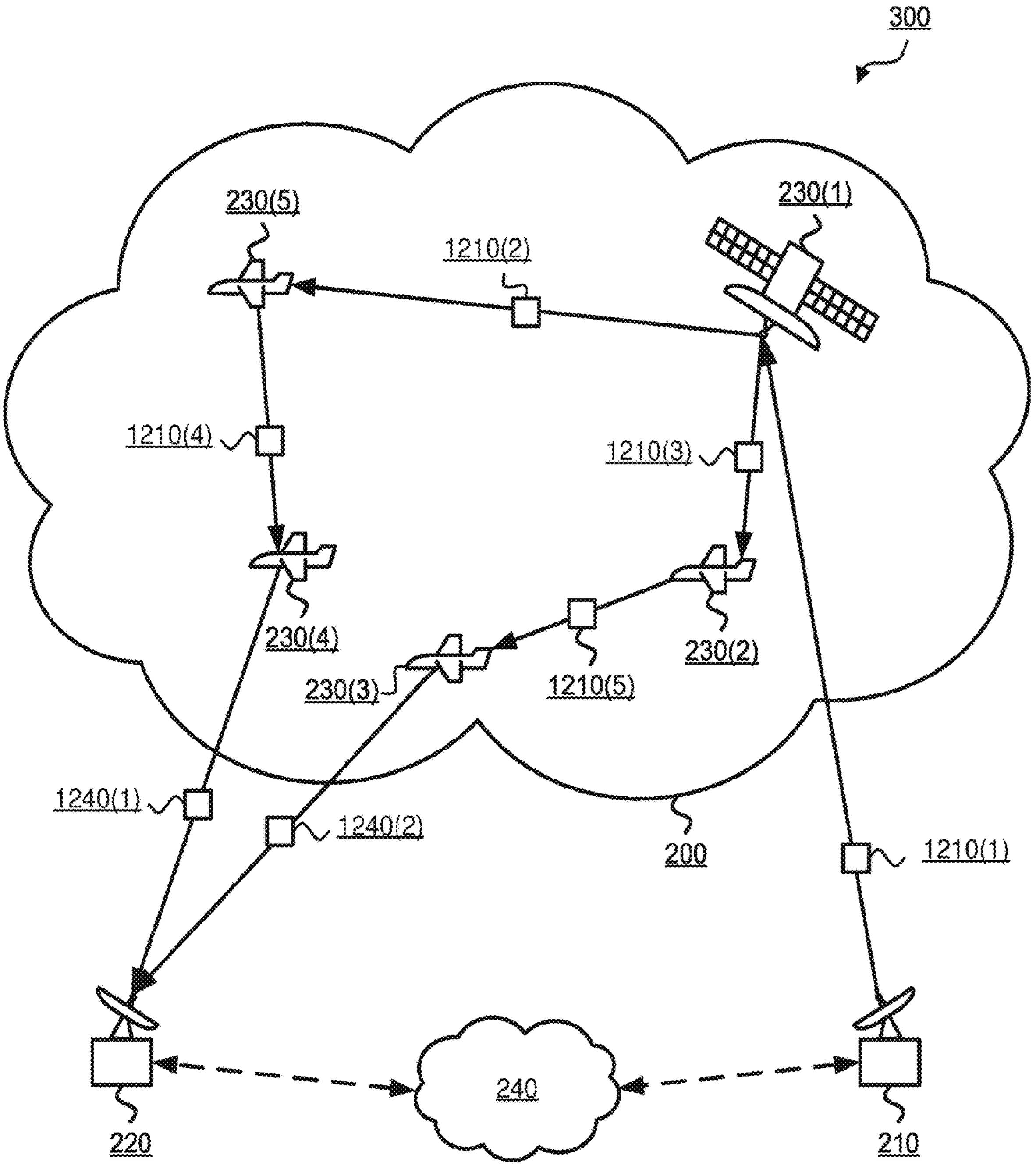
FIG. 14 is a diagrammatic representation showing the routes that will be used to convey data through the network for the initial datagram shown in FIGS. 12 and 13.

FIG. 14 is a diagrammatic representation showing the routes that will be used to convey data through the network 200 for the initial datagram 1210(1) shown in FIGS. 12 and 13. A first route, defined by the first core 1320(1) for the first share $S_1$, involves the first, fifth and fourth intermediate nodes 230(1), 230(5) and 230(4). Meanwhile, a second route, defined by the second core 1320(2) for the second share $S_2$, involves the first, second and third intermediate nodes 230(1), 230(2) and 230(3).

When the initial datagram 1210(1) is transmitted to the first intermediate node 230(1), the first intermediate node 230(1) decrypts the datagram 1210(1) using its cryptographic key to reveal a payload 1220(1) containing two encapsulated datagrams 1210(2) and 1210(3), as well as routing information 1230(1) for each of those two encapsulated datagrams. Note that the first intermediate node 230(1) remains unaware of the existence of the other encapsulated datagrams 1210(4) and 1210(5) due to their indirect encapsulation inside datagrams 1210(2) and 1210(3), which are not visible to the first intermediate node 230(1) owing to the encryption that is applied to those encapsulated datagrams (i.e. using the keys associated with the intermediate nodes 230(5) and 230(2) that are intended to process those datagrams). The first intermediate node 230(1) follows the routing information 1230(1) relating to each of the encapsulated datagrams 1210(2) and 1210(3) and forwards them to their intended recipient nodes 230(5) and 230(2) respectively.

Upon receipt of the datagram 1210(2), the fifth intermediate node 230(5) decrypts the datagram using its cryptographic key to unveil a payload 1220(2) containing a further encapsulated datagram 1210(4), as well as routing information 1230(2) for the encapsulated datagram 1210(4). The fifth intermediate node 230(5) follows the routing information 1230(2) and forwards the encapsulated datagram 1210(4) to the fourth intermediate node 230(4).

Similarly, upon receipt of the datagram 1210(3), the second intermediate node 230(2) decrypts the datagram using its cryptographic key to unveil a payload 1220(3) containing a further encapsulated datagram 1210(5), as well as routing information 1230(3) for the encapsulated datagram 1210(5). The second intermediate node 230(2) follows the routing information 1230(3) and forwards the encapsulated datagram 1210(5) to the third intermediate node 230 (3).

Upon receipt of the datagram 1210(4) from the fifth intermediate node 230(5), the fourth intermediate node 230(4) decrypts the datagram using its cryptographic key to unveil a payload 1220(4) containing data 1240(1) representing the share $S_1$, as well as routing information 1230(4). The fourth intermediate node 230(4) follows the routing information 1230(4) and forwards the data 1240(1) to the destination node 220.

Similarly, upon receipt of the datagram 1210(5) from the second intermediate node 230(2), the third intermediate node 230(3) decrypts the datagram using its cryptographic key to unveil a payload 1220(5) containing data 1240(2) representing the share S2, as well as routing information 1230(5). The third intermediate node 230(3) follows the routing information and forwards the data 1240(2) to the destination node 220.

Having received both shares $S_1$ and $S_2$, the destination node 220 is then able to reconstruct the original data represented by those shares in accordance with the secret sharing algorithm.

Figure 15:
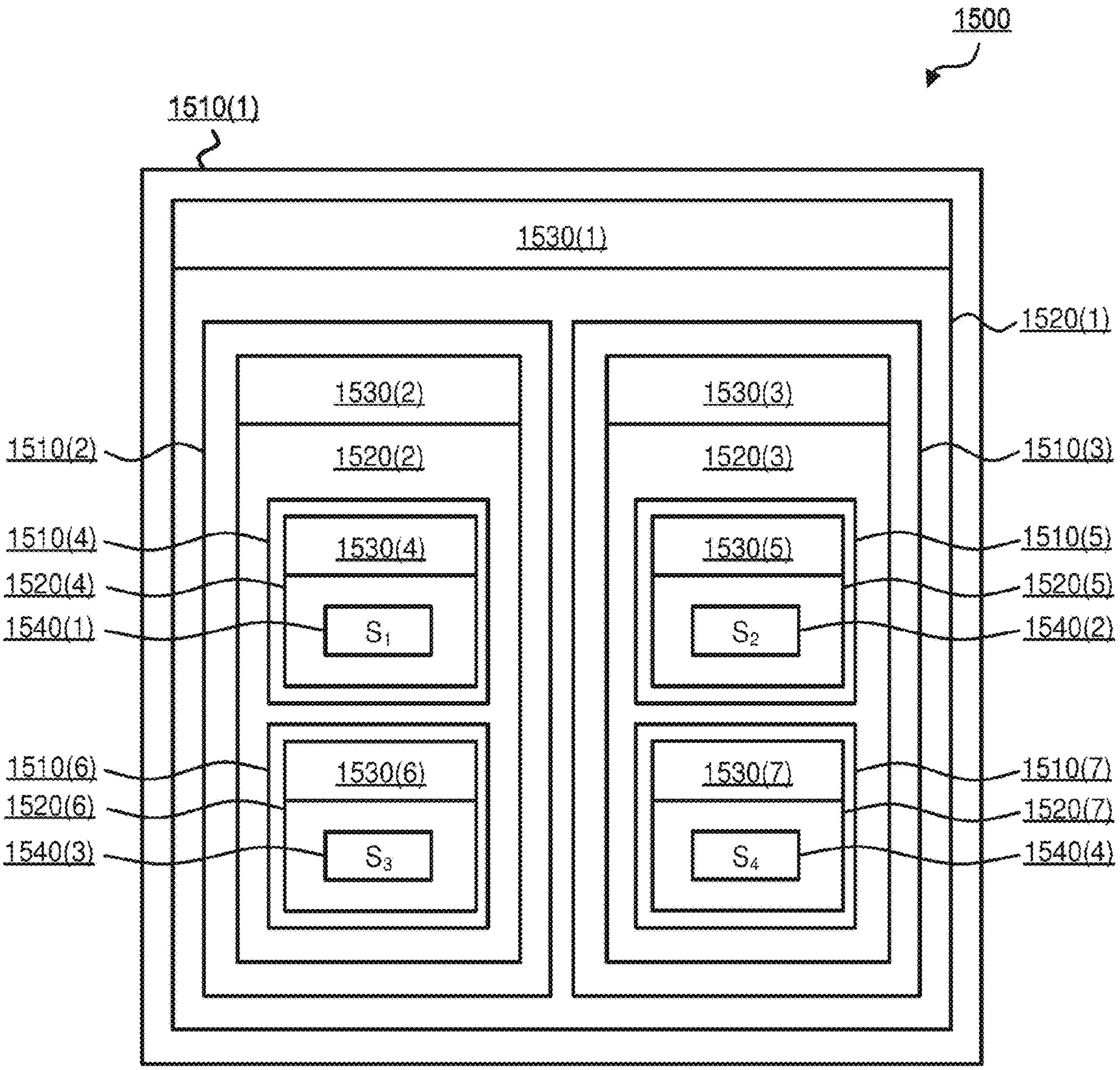
FIG. 15 is a diagrammatic representation of yet another example datagram constructed according to embodiments of the present invention.

FIG. 15 is a diagrammatic representation 1500 of yet another example datagram 1510(1) constructed according to embodiments of the present invention. In this example, there are seven datagrams 1510 that have been constructed, an initial datagram 1510(1) and six encapsulated datagrams 1510(2), 1510(3), 1510(4), 1510(5), 1510(6) and 1510(7).

Figure 16:
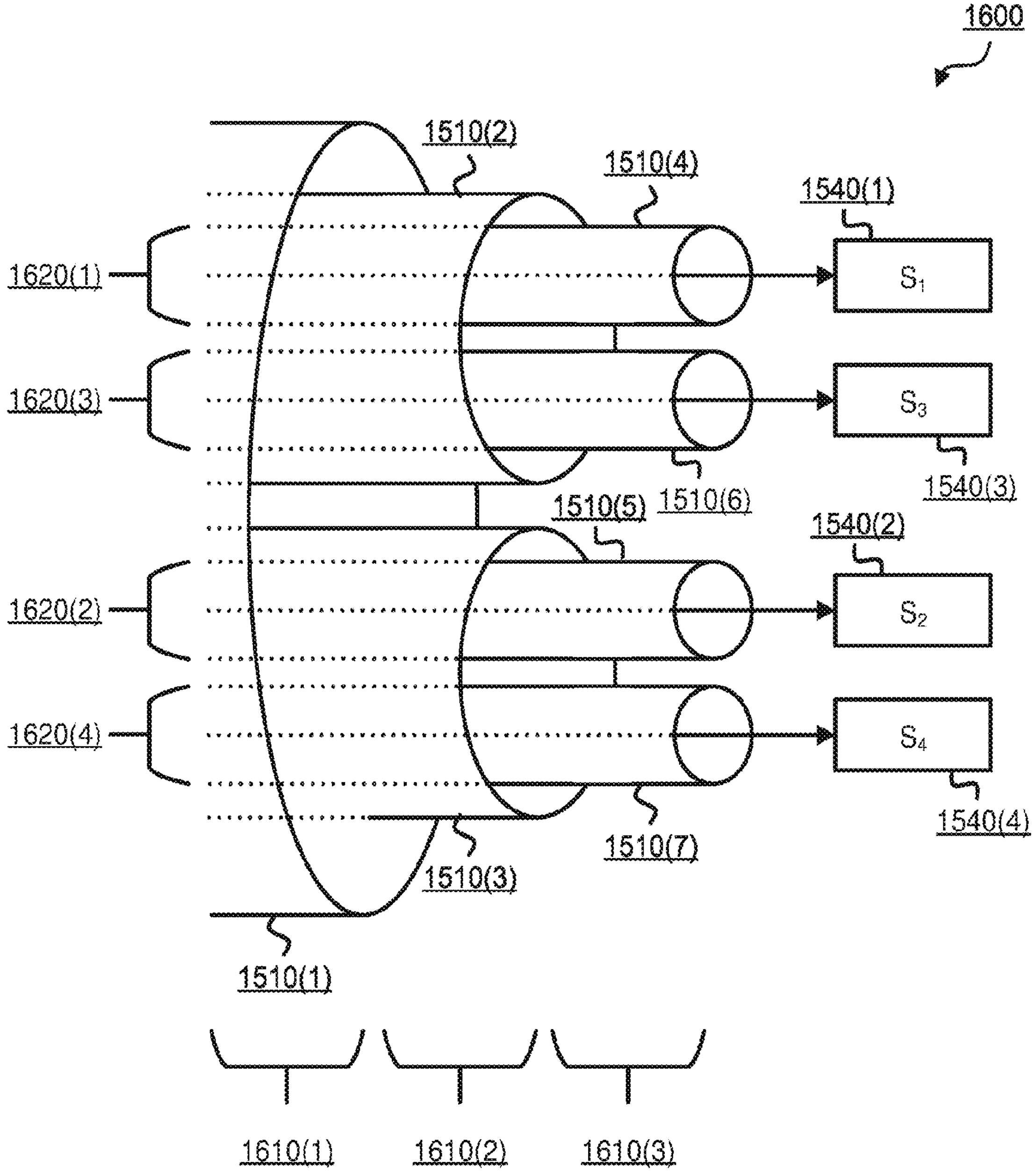
FIG. 16 is an alternative diagrammatic representation 1600 of the structure of the example datagram 1510(1) shown in FIG. 15.

FIG. 16 is an alternative diagrammatic representation 1600 of the structure of the example datagram 1510(1) shown in FIG. 15. As can be seen, in this example, three 'layers' 1610 and four 'cores' 1620 are defined by the datagram 1510(1), one 'core' for each of four shares $S_1$, $S_2$, $S_3$ and $S_4$. Accordingly, the datagram defines four different routes through the network 200, each route being defined by a separate 'core' 1620 for a particular one of the shares. Notably, in this example, there are multiple split datagrams, occurring in multiple different 'layers' 1610 of the datagram 1510(1). Specifically each of the initial, second and third datagrams 1510(1), 1510(2) and 1510(3) are 'split' datagrams (i.e. having multiple encapsulated datagrams in their respectively payloads 1520). This results in dispersal of the data occurring at three different intermediate nodes 230 within the network 200.

Figure 17:
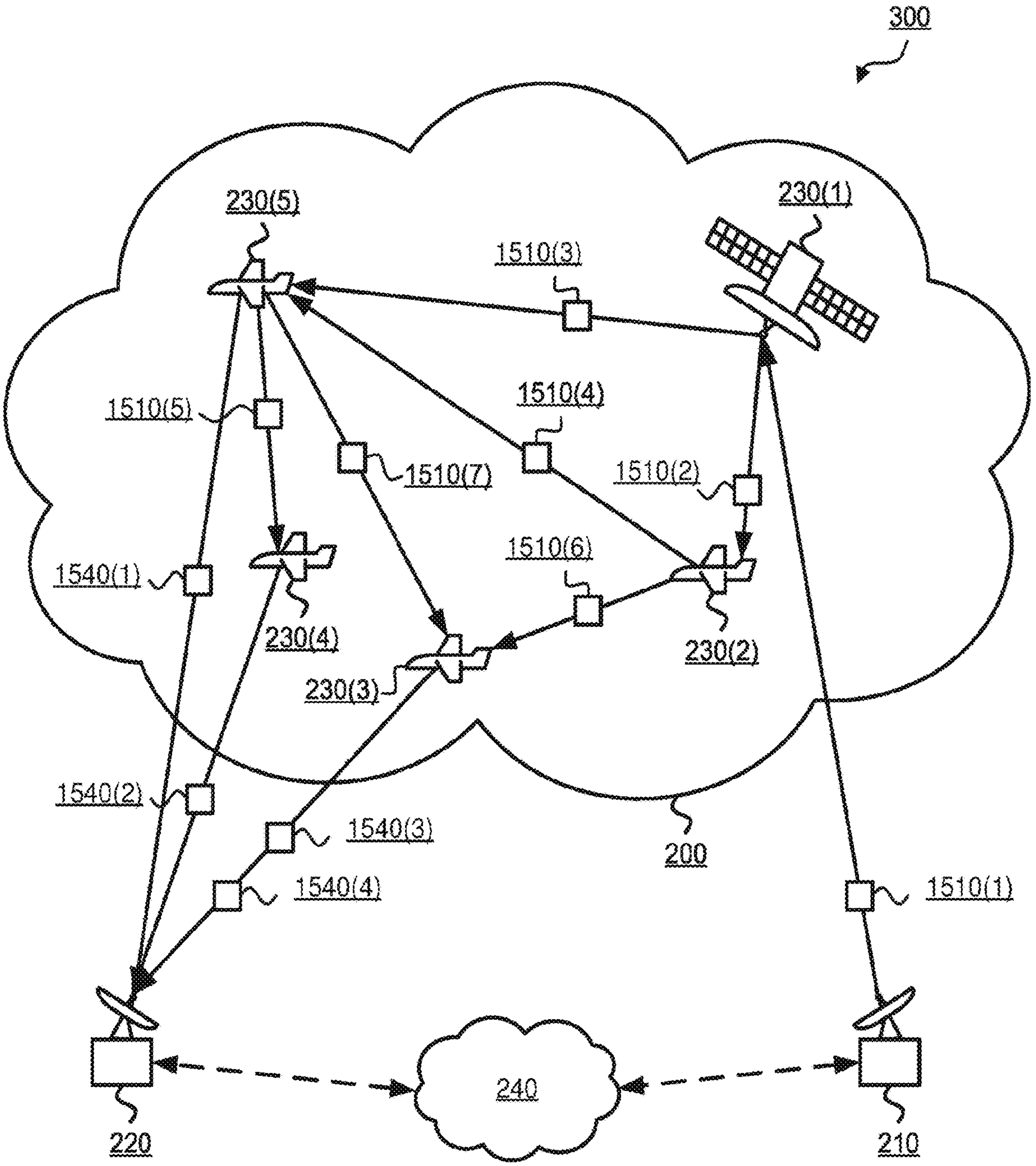
FIG. 17 is a diagrammatic representation showing the routes that will be used to convey data through the network for the initial datagram shown in FIGS. 15 and 16.

FIG. 17 is a diagrammatic representation showing the routes that will be used to convey data through the network 200 for the initial datagram 1510(1) shown in FIGS. 15 and 16. A first route, as defined by the first core 1620(1) for the first share $S_1$, involves the first, second and fifth intermediate nodes 230(1), 230(2) and 230(5). A second route, defined by the second core 1620(2) for the second share $S_2$, involves the first, fifth and fourth intermediate nodes 230(1), 230(5) and 230(4). A third route, defined by the third core 1620(3) for the third share $S_3$, involves the first, second, third intermediate nodes 230(1), 230(2) and 230(5). Finally, a fourth route defined by the fourth core 1620(4) for the fourth share $S_4$, involves the first, fifth and third intermediate nodes 230(1), 230(5) and 230(3).

When the initial datagram 1510(1) is transmitted to the first intermediate node 230(1), the first intermediate node 230(1) decrypts the datagram 1510(1) using its cryptographic key to reveal a payload 1520(1) containing two encapsulated datagrams 1510(2) and 1510(3), as well as routing information 1530(1) for each of those two encapsulated datagrams. Again, the first intermediate node 230(1) remains unaware of the existence of any of the other encapsulated datagrams 1510(4), 1510(5), 1510(6) and 1510 (7) due to their encapsulation on a further layer 1610(3) inside these datagrams 1510(2) and 1510(3). The first intermediate node 230(1) follows the routing information 1530 (1) relating to each of the encapsulated datagrams 1510(2) and 1510(3) and forwards them to their intended recipient nodes 230(2) and 230(5) respectively.

Upon receipt of the datagram 1510(2), the second intermediate node 230(2) decrypts the datagram using its cryptographic key to unveil a payload 1520(2) containing two further encapsulated datagrams 1510(4) and 1510(6), as well as routing information 1530(2) for each of those two encapsulated datagrams. The second intermediate node 230(1) follows the routing information 1530(2) relating to each of the encapsulated datagrams 1510(4) and 1510(6) and forwards them to their intended recipient nodes 230(5) and 230(3) respectively.

Similarly, upon receipt of the datagram 1510(3), the fifth intermediate node 230(5) decrypts the datagram using its cryptographic key to unveil a payload 1520(3) containing two further encapsulated datagrams 1510(5) and 1510(7), as well as routing information 1530(3) for each of those two encapsulated datagrams. The fifth intermediate node 230(5) follows the routing information 1530(3) relating to each of the encapsulated datagrams 1510(5) and 1510(7) and forwards them to their intended recipient nodes 230(4) and 230(3) respectively.

Upon receipt of the datagram 1510(4) from the second intermediate node 230(2), the fifth intermediate node 230(5) decrypts the datagram using its cryptographic key to unveil a payload 1520(4) containing data 1540(1) representing the first share $S_1$, as well as routing information 1530(4). The fifth intermediate node 230(5) follows the routing information 1530(4) and forwards the data 1540(1) to the destination node 220.

Similarly, upon receipt of the datagram 1510(5) from the fifth intermediate node 230(5), the fourth intermediate node 230(4) decrypts the datagram using its cryptographic key to unveil a payload 1520(5) containing data 1540(2) representing the second share $S_2$, as well as routing information 1530(5). The fourth intermediate node 230(4) follows the routing information 1530(5) and forwards the data 1540(2) to the destination node 220.

In this example, the third intermediate node 230(3) receives two different datagrams 1510(6) and 1510(7) from two different intermediate nodes 230(2) and 230(5) respectively. However, the third intermediate node 230(3) is not necessarily aware of any relationship between the two datagram 1510(6) and 1510(7) and simply processes the two datagrams individually. That is, upon receipt of each datagram 1510(6) and 1510(7), the third intermediate node 230(3) decrypts each of the datagrams using its cryptographic key to unveil their respective payloads 1520(6) and 1520(7) respectively comprising data 1540(3) and 1540(4) representing the shares $S_3$ and $S_4$, as well as respective routing data 1530(6) and 1530(7). The third intermediate node 230(3) follows the respective routing data 1530(6) and 1530(7) and forwards the data 1540(3) and 1540(4) to the destination node 220.

Although the intermediate node 230(3) knows that the data 1540(3) and 1540(4) have been forwarded to the same destination node 220, it does not necessarily know that they are related. That is to say, the intermediate node 230(3) does not know that the data 1540(3) and 1540(4) are shares relating to the same data being transmitted through the network 200. For example, they could be from two different source nodes 210. Similarly, in some cases, the intermediate node 230(3) may not be able to identify that the data is not just another datagram, nor that the node to which it is sent (i.e. the destination node 220) is not just another intermediate node 230. For example, where the destination node 220 is also used as an intermediate node 230 for other data transmission through the network 200, the intermediate node 230(3) may not know whether the destination node 220 is in fact the ultimate destination node for that data, or whether the destination node will function as an intermediate node 230 and forward the data on to another node.

Having received all of the shares $S_1$, $S_2$, $S_3$ and $S_4$, the destination node 220 is then able to reconstruct the original data represented by those shares in accordance with the secret sharing algorithm. As already discussed, since more than two shares are used in this example, a threshold may be used with the secret sharing algorithm to allow the original data to be reconstructed from a subset of the shares.

Figure 18:
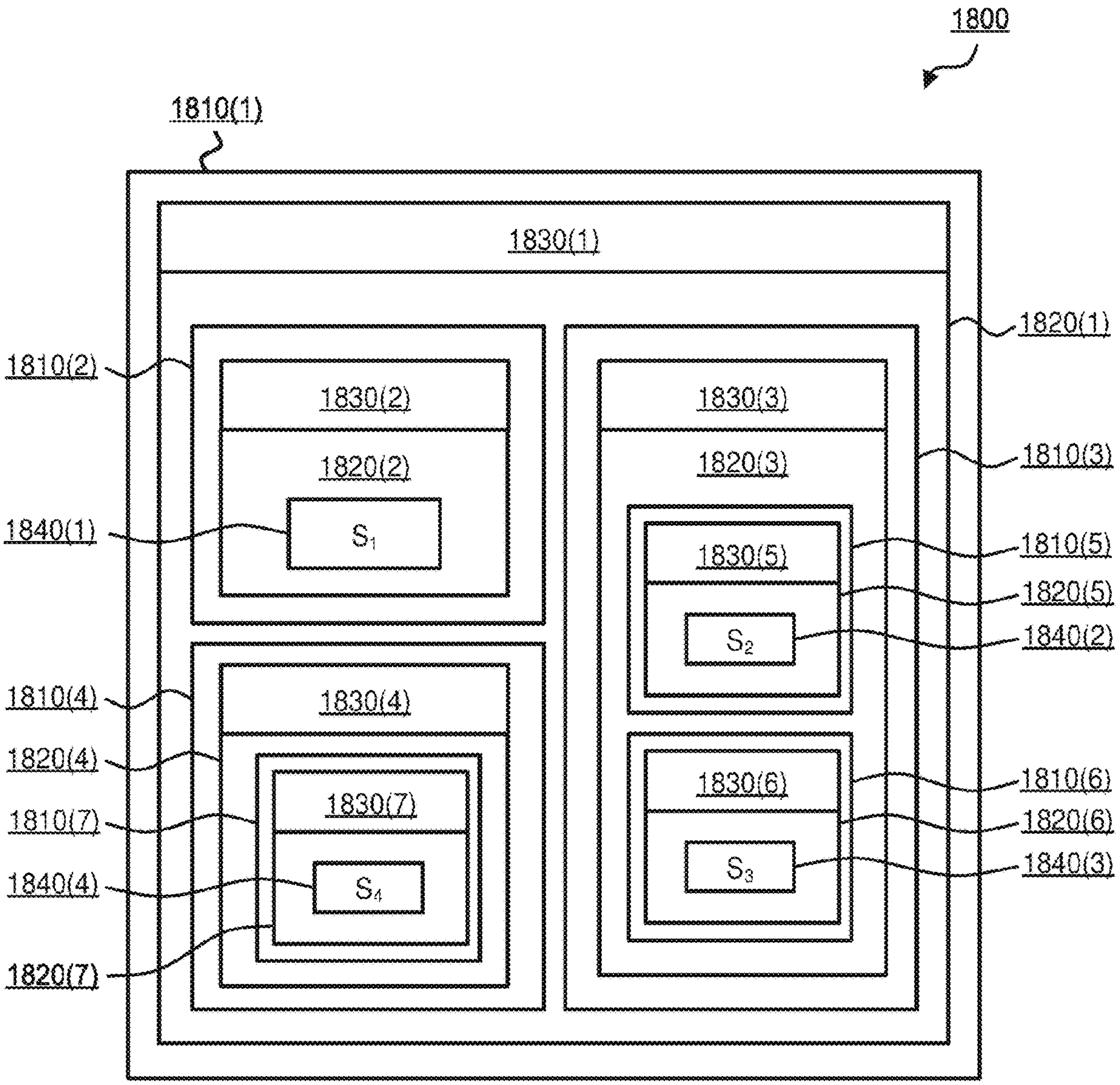
FIG. 18 is a diagrammatic representation of a final example datagram constructed according to embodiments of the present invention.

FIG. 18 is a diagrammatic representation 1800 of a final example datagram 1810(1) constructed according to embodiments of the present invention. In this example, there are seven datagrams 1810 that have been constructed, an initial datagram 1810(1) and six encapsulated datagrams 1810(2), 1810(3), 1810(4), 1810(5), 1810(6) and 1810(7).

Figure 19:
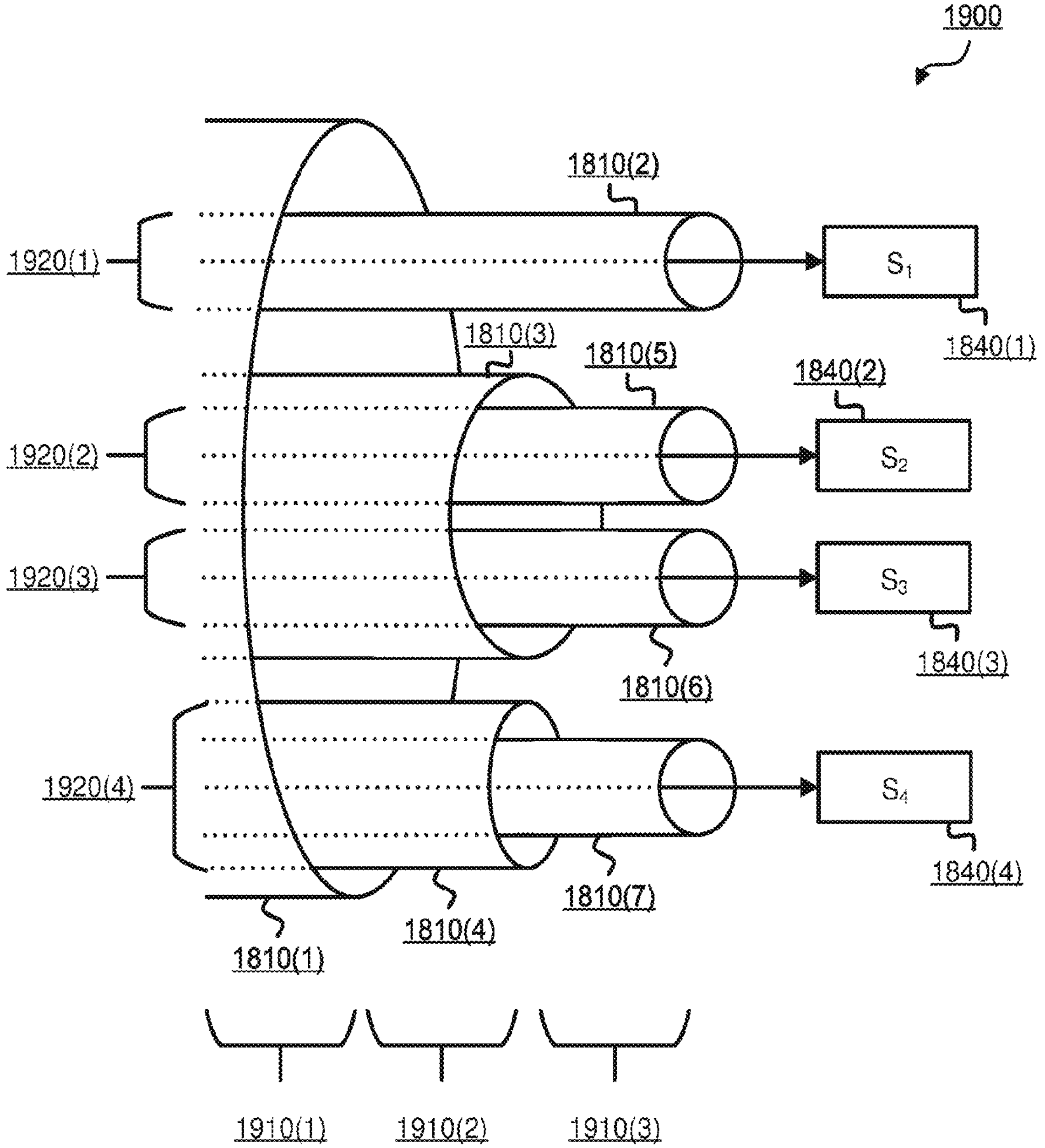
FIG. 19 is an alternative diagrammatic representation of the structure of the example datagram shown in FIG. 18.

FIG. 19 is an alternative diagrammatic representation 1900 of the structure of the example datagram 1810(1) shown in FIG. 18. As can be seen, in this example, the possibility for having asymmetrical structures within the datagram 1810(1) is demonstrated. As for all the other examples, the datagram 1810(1) comprises four 'cores' 1920, one 'core' defining a respective route for each share $S_1$, $S_2$, $S_3$ and $S_4$ of the data to be transmitted through the network 200. However, not all of the 'cores' 1920 have the same number of 'layers' 1910. For example, a first core 1920(1) only has two layers, whilst the remaining cores 1920(2), 1920(3) and 1920(4) each have three 'layers' 1910. This illustrates the general principle that the 'cores' of the datagram do not need to involve the same number of 'layers' as each other. Since the 'cores' define the routes taken by the shares through the network 200, this means that the routes taken by some shares through the network 200 can be shorter or longer than the routes taken by other shares. Similarly, the split 'layers' 1810(1) and 1810(3) do not need to have the same numbers of encapsulated datagrams.

For example, the first datagram 1810(1) comprises three encapsulated datagrams 1810(2), 1810(3) and 1810(4), whilst the third datagram 1810(3) only comprises two encapsulated datagrams 1810(5) and 1810(6).

Figure 20:
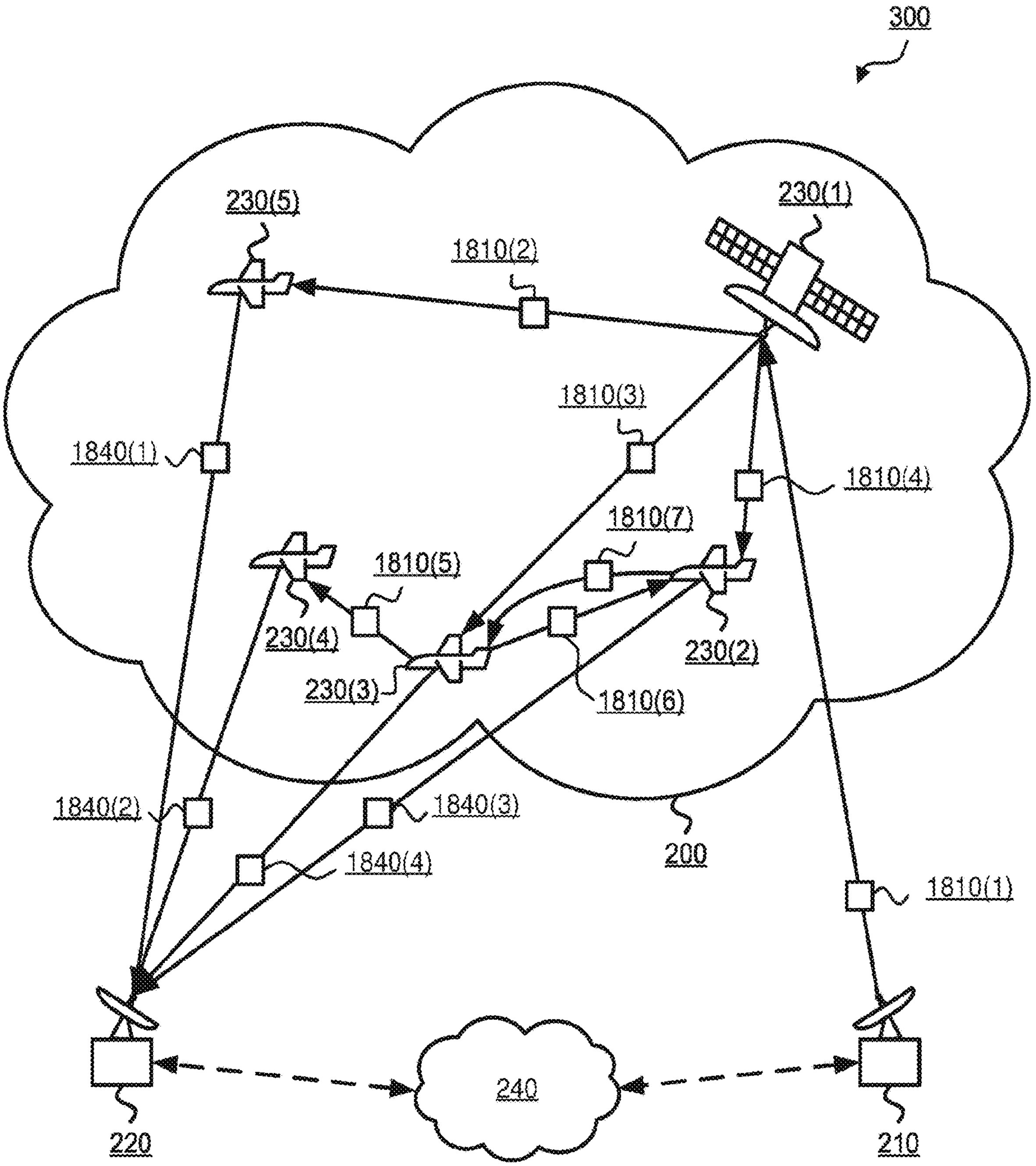
FIG. 20 is a diagrammatic representation showing the routes that will be used to convey data through the network for the initial datagram shown in FIGS. 18 and 19.

FIG. 20 is a diagrammatic representation showing the routes that will be used to convey data through the network 200 for the initial datagram 1810(1) shown in FIGS. 18 and 19. A first route, as defined by the first core 1920(1) for the first share $S_1$, involves the first and fifth intermediate nodes 230(1) and 230(5). A second route, as defined by the second core 1920(2) for the second share $S_2$, involves the first, third and fifth intermediate nodes 230(1), 230(3) and 230(5). A third route, as defined by the third core 1920(3) for the third share $S_3$, involves the first, third and second intermediate nodes 230(1), 230(3) and 230(2). A fourth route, as defined by the fourth core 1920(4) for the fourth share $S_4$, involves the first, second and third intermediate nodes 230(1), 230(2) and 230(3).

When the initial datagram 1810(1) is transmitted to the first intermediate node 230(1), the first intermediate node 230(1) decrypts the datagram 1810(1) using its cryptographic key to reveal a payload 1820(1) containing three encapsulated datagrams 1810(2), 1810(3) and 1810(4), as well as routing information 1830(1) for each of those three encapsulated datagrams. The first intermediate node 230(1)) follows the routing information 1830(1) relating to each of the encapsulated datagrams 1810(2), 1810(3) and 1810(4) and forwards them to their intended recipient nodes 230(5), 230(3), 230(2) respectively.

Upon receipt of the datagram 1810(2), the fifth intermediate node 230(5) decrypts the datagram using its cryptographic key to unveil a payload 1820(2) containing data 1840(1) representing first share $S_1$, as well as routing information 1830(2). The fifth intermediate node 230(5) follows the routing information 1830(2) and forward the data 1840(1) to the destination node 220.

Upon receipt of the datagram 1810(3), the third intermediate node 230(3) decrypts the datagram using its cryptographic key to unveil a payload 1820(3) containing two encapsulated datagrams 1810(5) and 1810(6), as well as routing information 1830(3) for each of these encapsulated datagrams. The third intermediate node 230(3) follows the routing information 1830(3) and forwards each of the encapsulated datagrams 1810(5) and 1810(6) to their intended recipient nodes 230(4) and 230(2) respectively.

Upon receipt of the datagram 1810(4), the second intermediate node 230(2) decrypts the datagram using its cryptographic key to unveil a payload 1820(4) containing an encapsulated datagram 1810(7), as well as routing information 1830(4) for the encapsulated datagram. The second intermediate node 230(2) follows the routing information 1830(4) and forwards the encapsulated datagram 1810(7) to its intended recipient node 230(3).

Upon receipt of the datagram 1810(5) from the third intermediate node 230(3), the fourth intermediate node 230(4) decrypts the datagram using its cryptographic key to unveil a payload 1820(5) containing data 1840(2) representing the second share $S_2$, as well as routing information 1830(5). The third intermediate node 230(3) follows the routing information 1830(5) and forwards the data 1840(2) to the destination node 220.

Upon receipt of the datagram 1810(6) from the third intermediate node 230(3), the second intermediate node 230(2) decrypts the datagram using its cryptographic key to unveil a payload 1820(6) containing data 1840(3) representing the third share $S_3$, as well as routing information 1830(6). The second intermediate node 230(2) follows the routing information 1830(6) and forwards the data 1840(3) to the destination node 220.

Upon receipt of the datagram 1810(7) from the second intermediate node 230(2), the third intermediate node 230(3) decrypts the datagram using its cryptographic key to unveil a payload 1820(7) containing data 1840(4) representing the fourth share S4, as well as routing information 1830(7). The third intermediate node 230(3) follows the routing information 1830(7) and forwards the data 1840(4) to the destination node 220.

Having received all of the shares $S_1$, $S_2$, $S_3$ and $S_4$, the destination node 220 is then able to reconstruct the original data represented by those shares in accordance with the secret sharing algorithm. As already discussed, since more than two shares are used in this example, a threshold may be used with the secret sharing algorithm to allow the original data to be reconstructed from a subset of the shares.

Although not shown in the figures accompanying the above-discussed examples, it will be appreciated that additional complexity in the routing of the data through the network 200 can be achieved by re-utilizing the same techniques, but at a lower level to further secure the transmission of data between the intermediate nodes 230 within the network. In other words, an encapsulated datagram that is to be forwarded from one intermediate node to another can be split into shares that collectively represent that datagram and those shares can be sent to the other intermediate node via different routes and then recombined at the other intermediate node to recreate the encapsulated datagram, where it can be processed as described above. Of course, in some cases, this can be performed on an ad-hoc basis, with the intermediate nodes 230 choosing to forward a datagram to the next intermediate node indirectly using this technique (for example, where it is not possible to directly communicate the datagram to the next intermediate node). In other cases, this mode of communication between intermediate nodes can be specified by the initial datagram that is created by the source node 210. For example, instead of encapsulating the datagram that is to be provided to the next intermediate node in a route in the payload intended for a particular intermediate node, multiple encapsulated datagrams can be encapsulated instead, whereby the multiple encapsulated datagrams convey shares that collectively represent the particular datagram for the next intermediate node. These multiple encapsulated datagrams include routing information (and possibly further encapsulated datagrams) to convey the shares the next intermediate node along different routes using other nodes as intermediaries. At least one of the datagrams that is ultimately delivered to the next intermediate node (which may be referred to as a partial datagram, since it only conveys part of the datagram intended for the next intermediate node) includes instructions for instructing that intermediate node to reconstruct the full datagram by combining the share received by that datagram with the one or more shares conveyed by at least one other datagram in accordance with a secret sharing algorithm. The next intermediate node can then reconstruct the datagram for the higher-level route by recombining the shares from the partial datagrams (the datagrams of the lower-level route), which can be processed in accordance with the method 800 illustrated in FIG. 8 to carry on the higher-level routing of the original data from the source node 210.

In some cases, embodiments of the invention may be used together with an additional step of secret sharing performed by the source node. That is to say, the source node may split data that is to be transmitted into shares and may construct a datagram for transmitting each share through the network 200. That is to say, each share may be considered separately as the data to be transmitted and a separate datagram for transmitting each share may be constructed according to the method 400 shown in FIG. 4. In constructing each separate datagram, the shares will be further split into sub-shares, with each sub-share preferably being sent via a different route through the network 200, as described above. Preferably the datagram that is constructed for transmitting each share utilises a different first intermediate node (though this is not necessary). In some cases, the source node may apply a random, variable time delay before transmitting each separate datagram.

In some networks, the final step of transmitting to the destination could be a weak point. This is less likely to be the case in networks for which the final destination is also moving around (for example networks of drones or vehicles). Indeed, where nodes simultaneously function as intermediate nodes for some traffic while functioning as source and/or destination nodes for other traffic (e.g. in a mesh network), it will be difficult for any eavesdropper to gain any information on the traffic even if they were able to obtain and decrypt some of the shares. However, where the destination node 220 is fixed, with limited means for communicating the shares over a final hop to the destination node 220 being available (e.g. where only a single fibre channel is available to communicate with the destination node 220 over a final hop in the data transmission) this may represent a weak point due to the colocation of more (or all) of the shares representing the data at this point. Such a penultimate node may therefore be a prime target for attempted interception of the data. Although the shares are preferably still encrypted at this stage in a manner that can be decrypted by the destination node 220, it may potentially be a negative factor when the technique is being used to refresh cryptographic keys. To mitigate this, the destination node 220 can be included as an intermediate node 230 one or more times within the splitting tree in addition to appearing as the destination node 220. Preferably different encryption keys will be used when the destination node 220 appears as an intermediate node 230. As an example, when the technique is being used to refresh a cryptographic key, a cache of previous cryptographic keys may be kept and the older keys may be used by the destination node 220 in its capacity as an intermediate node 230 during the routing. To further mitigate this issue, for the final generations of the splitting tree (i.e. the final parts of the routes for each share), the source node 210 may choose to use as diverse a set of communications channels as possible. For example, it may make use of other data communication channels which are out-of-band with respect to most of the communications between the intermediate nodes 230, such as satellites, or mobile devices. These nodes may be expensive to use, or have low bandwidth, hence why they are only used for a few of the shares as they take their final (and most distinguishable) path to the destination node 220.

In some implementations, when the traffic levels on all or part of the network fall below a threshold, the intermediate nodes may generate traffic containing empty or random data, and labelled as such within the lowest level of the nested encrypted datagrams, but otherwise indistinguishable from useful datagram traffic. For example, when the number of datagrams per second received to be forwarded by any given intermediate node falls below a limit, the node may start to randomly generate data to be encrypted (and optionally split and nested according to the method described herein, and sent to other nodes).

Figure 21:
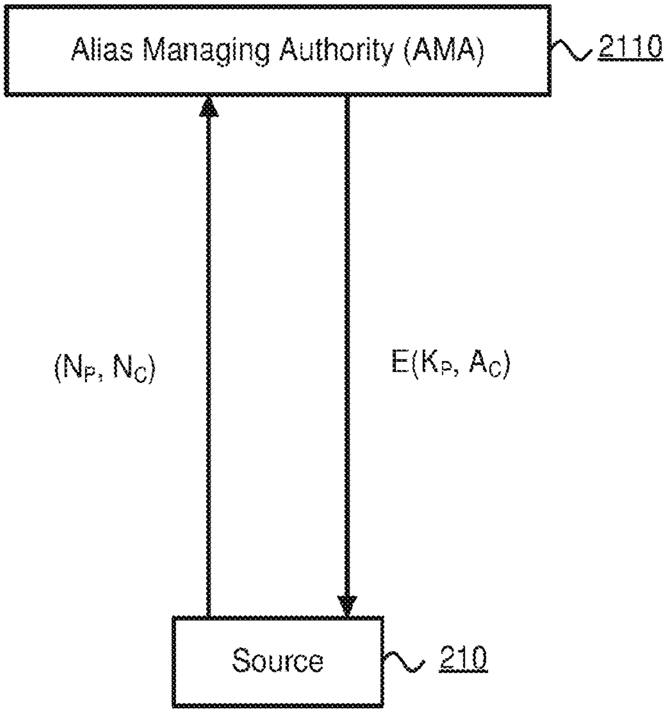
FIG. 21 is a diagrammatic representation of an Alias Managing Authority (AMA) that may be used with embodiments of the invention.

FIG. 21 is a diagrammatic representation of an Alias Managing Authority (AMA) 2110 that may be used with embodiments of the invention. The AMA functions to control the visibility of the aliases for the different network nodes that are used in the network 200. This can prevent any one node learning all of the aliases that are in use, making it harder to reconstruct the data that has flowed through the network 200 in the event of the network 200 being compromised. This is achieved through the use of encryption to encrypt the alias of a node using a key known only to the node which needs to know that alias (i.e. the node which is going to process the identifier and forward the data to the network node having that alias). For example, when constructing the datagrams during the method 400 illustrated in FIG. 4, the source node 210 may communicate with the AMA to obtain encrypted versions of the aliases for inclusion in the routing information of a datagram. This can be achieved by sending an identifier of the node $N_P$ (or parent node in the splitting tree representation) that is to process the routing information (i.e. the node that needs to know the alias) and the target node $N_C$ (or child node in the splitting tree representation) to which the payload (or part thereof) of that datagram is to be sent (i.e. the node whose alias needs including in the routing information). The AMA will then provide an encrypted representation $E(K_P, A_C)$ of an alias $A_C$ for the target (or child) node $N_C$. This encrypted representation is encrypted using a key associated with the node $N_P$ that is to process the routing information. The source node 210 may then include this encrypted representation in the routing information for a datagram, without needing to know the actual alias $A_C$ that is used for the network node $N_C$. When processing the routing information, the relevant intermediate node 230 can use the key $K_P$ to decrypt the encrypted representation $E(K_P, A_C)$ of the alias to obtain the alias $A_C$ for the node to which it needs to forward data.

To achieve this, the AMA stores the aliases for each node the network 200 in a repository. There may be many aliases for each different node. The AMA may also store information about which aliases are known to which nodes. That is to say, it may be desired to keep the existence of specific aliases hidden from different nodes in the network and the AMA may store information about these restrictions in its alias repository. Accordingly, each alias may be known to a different subset of node in the network 200. In some cases, for example, each alias may only be known to one node in the network 200, meaning that each node refers to a particular node by a different alias.

The AMA also has a key repository in which it stores the cryptographic keys associated with each network node. The AMA uses the keys to encrypt the alias that is returned in response to a request with the key of the need that the alias is intended for (as opposed to the node that is making the request for the alias to the AMA).

The AMA further comprises a query processor which processes requests for aliases from nodes within the network 200. The query processor is configured to receive a request for an identifier for a network node. This identifier is an encrypted version of the alias $E(K_P, A_C)$ for a network node $A_C$ which can be used by the network node $N_P$. The network node $N_P$ can use the identifier $E(K_P, A_C)$ to obtain an alias $A_C$ for the network node $N_C$ which it can use to route data to the network node $N_C$. The request comprises an indication of a target node $N_C$ to which the identifier relates (i.e. the node whose alias should be conveyed by the identifier). The request also comprises an indication of the node $N_P$ that is intended to process the identifier (i.e. the node that should be able to obtain the alias $A_C$ from the identifier). The query processor processes the request by identifying an alias for the target node $N_C$ which is known to the node $N_P$ that is intended to process the identifier. That is to say, the query processor refers to the alias repository to identify an alias for the target node $N_C$ that is known to the node $N_P$ intended to process the identifier. Where multiple aliases for the target node $N_C$ are known to the node $N_P$ intended to process the identifier, any suitable technique for selecting one of those multiple aliases may be used (e.g. by randomly selecting one). The query processor obtains an encryption key $K_P$ for the node $N_P$ intended to process the identifier and uses the encryption key $K_P$ to encrypt the alias for the target node $N_C$, thereby creating an identifier $E(K_P, A_C)$ for the target node $N_C$ for the node $N_P$ intended to process the identifier. Finally, the query processor provides the identifier $E(K_P, A_C)$ to the requesting node (e.g. source node 210) in response to its request.

As will be appreciated, the use of the AMA can help prevent any source nodes 210 using the network 200 from learning all the aliases for the intermediate nodes 230 in the network 200. This can improve the security of the data passing through the network 200 by making it much more difficult to piece together different parts of the data in the event that the intermediate nodes were compromised. Of course, it is expected that the use of an AMA may help provide security in other inventions not involving split-core onion datagrams. Indeed, in situations where the directions for routing data through a network are specified by a separate node from that which is actually transmitting the data the AMA may help further obfuscate the passage of that data. Accordingly, the AMA may also be employed in situations where data is routed via multiple hops, where each intermediate node forwards the data to another node, such as in conventional onion routing.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example. Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention. It will be understood by those skilled in the art that, although the present invention has been described in relation to the above described example embodiments, the invention is not limited thereto and that there are many possible variations and modifications which fall within the scope of the invention. The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of transmitting data through a network, performed by a source node to transmit data to a destination node via a plurality of intermediate nodes, the method comprising:

splitting the data into a plurality of shares using a secret sharing algorithm;

determining a respective route through the network to the destination node for each of the plurality of shares, each route comprising a plurality of intermediate nodes via which that share is to be transmitted, wherein at least two of the routes are different from each other and at least a first intermediate node of each route is common to other routes;

constructing a plurality of datagrams for conveying the plurality of shares through the network along their respective routes, each datagram being intended for processing by a respective intermediate node and being encrypted with a key associated with that intermediate node, each datagram comprising a payload and routing information for instructing the respective intermediate node to forward data contained in the payload for conveying one or more of the shares along their respective routes towards the destination node, wherein: the portion of the respective routes of the one or more shares prior to the respective intermediate node are common to each other; each datagram other than an initial datagram intended for the first intermediate node is encapsulated within the payload of a preceding datagram intended for a preceding intermediate node on the respective routes of the one or more shares; the payload of at least one of the datagrams comprises a plurality of encapsulated datagrams; and the routing information of the at least one of the datagrams instructs the respective intermediate node to transmit the plurality of encapsulated datagrams on to different respective intermediate nodes in the network; and transmitting the initial datagram to the first intermediate node.

2. The method of claim 1, wherein each of the routes is different from other routes.

3. The method of claim 1 wherein the initial datagram comprises a plurality of encapsulated datagrams for onward transmission to different respective intermediate nodes.

4. The method of claim 1, wherein one or more of the datagrams subsequent to the initial datagram comprises a plurality of encapsulated datagrams for onward transmission to different respective intermediate nodes.

5. The method of claim 1, wherein the datagrams are encrypted using symmetric cryptography.

6. The method of claim 1, wherein the data comprises an encryption key for encrypting communications between the source node and the destination node.

7. The method of claim 1, wherein the transmissions within the network are made using quantum channels.

8. The method of claim 1, wherein the intermediate nodes are provided by a plurality of unmanned aerial vehicles.

9. The method of claim 8, wherein the determination of the respective routes through the network are based, at least in part, on the flight plans of the unmanned aerial vehicles.

10. The method of claim 8, wherein the intermediate nodes further comprise an intermediate node provided by a satellite, the satellite providing the first intermediate node.

11. The method of claim 1, wherein the intermediate nodes comprise virtual network nodes that are each separately identifiable and each associated with their own respective key, wherein each virtual network node is provided by a respective physical network node and at least two of the virtual network nodes are provided by the same physical network node.

12. The method of claim 11, wherein at least one of the respective routes uses different virtual network nodes that are provided by the same physical network node as separate intermediate nodes.

13. The method of claim 11, wherein at least two of the respective routes make use of different virtual network nodes that are provided by the same physical network node as intermediate nodes.

14. The method of claim 11, wherein the method further comprises communicating with an alias managing authority to obtain an encrypted representation of an identity of an intermediate node for inclusion in the routing information of a datagram, the encrypted representation being encrypted using a key that is shared between an intermediate node intended to process the datagram and the alias managing authority.

15. The method of claim 1, wherein the plurality of intermediate nodes are operated by a plurality of different entities, each intermediate node being operated by a respective one of the entities, wherein the determination of the respective routes through the network are based, at least in part, on the entities that are operating the intermediate nodes.

16. The method of claim 1, wherein at least one of the datagrams further comprises instructions for instructing the respective intermediate node that is intended to process that datagram to reconstruct a datagram to be processed by that intermediate node by combining one or more shares conveyed by that datagram with one or more shares conveyed by at least one other datagram in accordance with a secret sharing algorithm, wherein the at least one other datagrams are each configured to be conveyed to the respective intermediate node via a different respective route.

17. A computer implemented method of transmitting data through a network from a source node to a destination node via a plurality of intermediate nodes, the method being performed by one or more of the intermediate nodes in the network to facilitate the transmission of data through the network from a source node to a destination node via a plurality of intermediate nodes, the method comprising:

receiving a datagram, the datagram being encrypted using a key associated with the intermediate node;

decrypting the datagram using the key to create a decrypted datagram, the decrypted datagram comprising a plurality of encapsulated datagrams, each of the encapsulated datagrams being encrypted with a key associated with another node and being associated with respective routing information;

transmitting each of the encapsulated datagrams on to a different respective node in accordance with the respective routing information.

18. The method of claim 17, wherein the datagram is received from the source node.

19. The method of claim 18, wherein the intermediate node is provided by a satellite.

20. The method of claim 17, wherein the datagram is received from another one of the intermediate nodes.

21. The method of claim 17, wherein the intermediate node is provided by an unmanned aerial vehicle.

22. The method of claim 17, wherein the key is a symmetric key shared between the intermediate node and the source node.

23. The method of claim 17, wherein the datagram and the encapsulated datagrams are respectively received and transmitted using quantum channels.

24. The method of claim 17, wherein the intermediate node is one of a plurality of virtual network nodes provided by the same physical network node, wherein each of the virtual network nodes is separately identifiable and associated with their own respective key.

25. The method of claim 17, wherein the received datagram is a partial datagram and comprises instructions for instructing the intermediate node to combine one or more shares conveyed by that partial datagram with one or more shares conveyed by at least one other datagram in order to reconstruct the datagram, the method further comprising:

receiving a further datagram from a different intermediate node; and combining one or more shares conveyed by the further datagram with one or more shares conveyed by the received datagram to reconstruct the datagram.

26. A network node configured to act as an intermediate node in a network for facilitating the transmission of data through the network from a source node to a destination via a plurality of intermediate nodes by performing a method according to claim 17.

27. A computer system comprising a processor and a memory storing computer program code, which upon execution by the processor is for transmitting data through a network, performed by a source node to transmit data to a destination node via a plurality of intermediate nodes such that the computer system is at least configured to:

split the data into a plurality of shares using a secret sharing algorithm;

determine a respective route through the network to the destination node for each of the plurality of shares, each route comprising a plurality of intermediate nodes via which that share is to be transmitted, wherein at least two of the routes are different from each other and at least a first intermediate node of each route is common to other routes;

construct a plurality of datagrams for conveying the plurality of shares through the network along their respective routes, each datagram being intended for processing by a respective intermediate node and being encrypted with a key associated with that intermediate node, each datagram comprising a payload and routing information for instructing the respective intermediate node to forward data contained in the payload for conveying one or more of the shares along their respective routes towards the destination node, wherein: the portion of the respective routes of the one or more shares prior to the respective intermediate node are common to each other; each datagram other than an initial datagram intended for the first intermediate node is encapsulated within the payload of a preceding datagram intended for a preceding intermediate node on the respective routes of the one or more shares; the payload of at least one of the datagrams comprises a plurality of encapsulated datagrams; and the routing information of the at least one of the datagrams instructs the respective intermediate node to transmit the plurality of encapsulated datagrams on to different respective intermediate nodes in the network; and transmit the initial datagram to the first intermediate node.

28. A non-transitory computer-readable storage medium storing a computer program which, when executed by one or more processors, is arranged to carry out a method of transmitting data through a network, performed by a source node to transmit data to a destination node via a plurality of intermediate nodes, the method comprising:

splitting the data into a plurality of shares using a secret sharing algorithm;

determining a respective route through the network to the destination node for each of the plurality of shares, each route comprising a plurality of intermediate nodes via which that share is to be transmitted, wherein at least two of the routes are different from each other and at least a first intermediate node of each route is common to other routes;

constructing a plurality of datagrams for conveying the plurality of shares through the network along their respective routes, each datagram being intended for processing by a respective intermediate node and being encrypted with a key associated with that intermediate node, each datagram comprising a payload and routing information for instructing the respective intermediate node to forward data contained in the payload for conveying one or more of the shares along their respective routes towards the destination node, wherein: the portion of the respective routes of the one or more shares prior to the respective intermediate node are common to each other; each datagram other than an initial datagram intended for the first intermediate node is encapsulated within the payload of a preceding datagram intended for a preceding intermediate node on the respective routes of the one or more shares; the payload of at least one of the datagrams comprises a plurality of encapsulated datagrams; and the routing information of the at least one of the datagrams instructs the respective intermediate node to transmit the plurality of encapsulated datagrams on to different respective intermediate nodes in the network; and transmitting the initial datagram to the first intermediate node.

* * * * *